United States Patent
Dixit

(10) Patent No.: US 11,409,866 B1
(45) Date of Patent: Aug. 9, 2022

(54) ADAPTIVE CYBERSECURITY FOR VEHICLES

(71) Applicant: Northrop Grumman Systems Corporation, Falls Church, VA (US)

(72) Inventor: Sunil Dixit, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/358,758

(22) Filed: Jun. 25, 2021

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,208,955 B1 | 3/2001 | Provan et al. | |
| 6,766,230 B1 | 7/2004 | Rizzoni et al. | |
| 7,457,785 B1 | 11/2008 | Greitzer | |
| 8,838,324 B2 | 9/2014 | Suzuki et al. | |
| 8,855,943 B1 | 10/2014 | Matsui et al. | |
| 9,245,116 B2* | 1/2016 | Evans | G06F 21/55 |
| 10,089,214 B1 | 10/2018 | Dixit | |
| 10,235,523 B1* | 3/2019 | Keller, III | G06F 13/4282 |
| 10,676,048 B2 | 6/2020 | Dixit et al. | |
| 10,725,463 B1 | 7/2020 | Dixit | |
| 10,814,883 B1 | 10/2020 | Dixit | |
| 2003/0200069 A1 | 10/2003 | Volponi | |
| 2005/0212523 A1 | 9/2005 | Chang et al. | |
| 2006/0047487 A1 | 3/2006 | Volponi et al. | |
| 2006/0064291 A1 | 3/2006 | Pattipatti et al. | |
| 2008/0040152 A1 | 2/2008 | Vian | |

(Continued)

FOREIGN PATENT DOCUMENTS

| | | |
|---|---|---|
| EP | 1643332 | 4/2006 |
| EP | 2336918 | 6/2011 |
| EP | 2549415 | 1/2013 |

OTHER PUBLICATIONS

International Search Report in related Application Serial No. PCT/US19/043362, dated Nov. 8, 2019, 11 pages.

(Continued)

*Primary Examiner* — Christopher C Harris
(74) *Attorney, Agent, or Firm* — McCracken & Gillen LLC

(57) ABSTRACT

A method, implemented by a computing system on-board a vehicle, differentiates whether an anomaly originating from a hardware component of the vehicle is caused by a cybersecurity threat, by a degradation of the performance of the hardware component, or by both. States of the respective nodes in a first group of nodes of the first hardware component are compared with a stored table of sets of states of nodes in the first group. A determination is made of whether the anomaly associated with the first hardware component is caused by a cybersecurity threat or by health degradation of the first hardware component based on the comparison of the states of the nodes of the first group with the sets of possible states of the respective nodes where each set is associated with one of a cybersecurity threat and health degradation.

10 Claims, 15 Drawing Sheets

(56) References Cited

U.S. PATENT DOCUMENTS

| | | |
|---|---|---|
| 2008/0312783 A1 | 12/2008 | Mansour et al. |
| 2013/0339574 A1 | 12/2013 | Franceschini |
| 2015/0149119 A1 | 5/2015 | Fansler |
| 2016/0034270 A1 | 2/2016 | Swierc et al. |
| 2017/0039370 A1* | 2/2017 | Mead ................ H04L 63/1425 |
| 2018/0186469 A1 | 7/2018 | Gregory |
| 2019/0147670 A1 | 5/2019 | Chopra et al. |
| 2020/0175171 A1* | 6/2020 | Rieger ............... G05B 19/0425 |

OTHER PUBLICATIONS

International Search Report in related Application Serial No. PCT/US2021/017525, dated May 21, 2021, 13 pages.

Chen Xiongzi, Yu Jinsong, Tang Diyin and Wang Yingxun, "Remaining useful life prognostic estimation for aircraft sybsystems or components: A review," IEEE 2011 10th International Conference on Electronic Measurement & Instruments, Chengdu, 2011, pp. 94-98, doi: 10.1109/ICEMI.2011.6037773.

* cited by examiner

FIG. 5
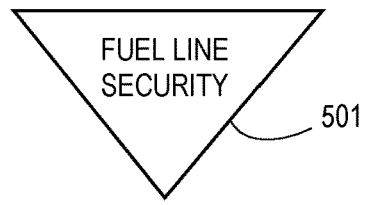
IN THE MODEL DOUBLE-CLICK ON SECURITY NODE
INVOKES NODE PROPERTIES DIALOG BOX
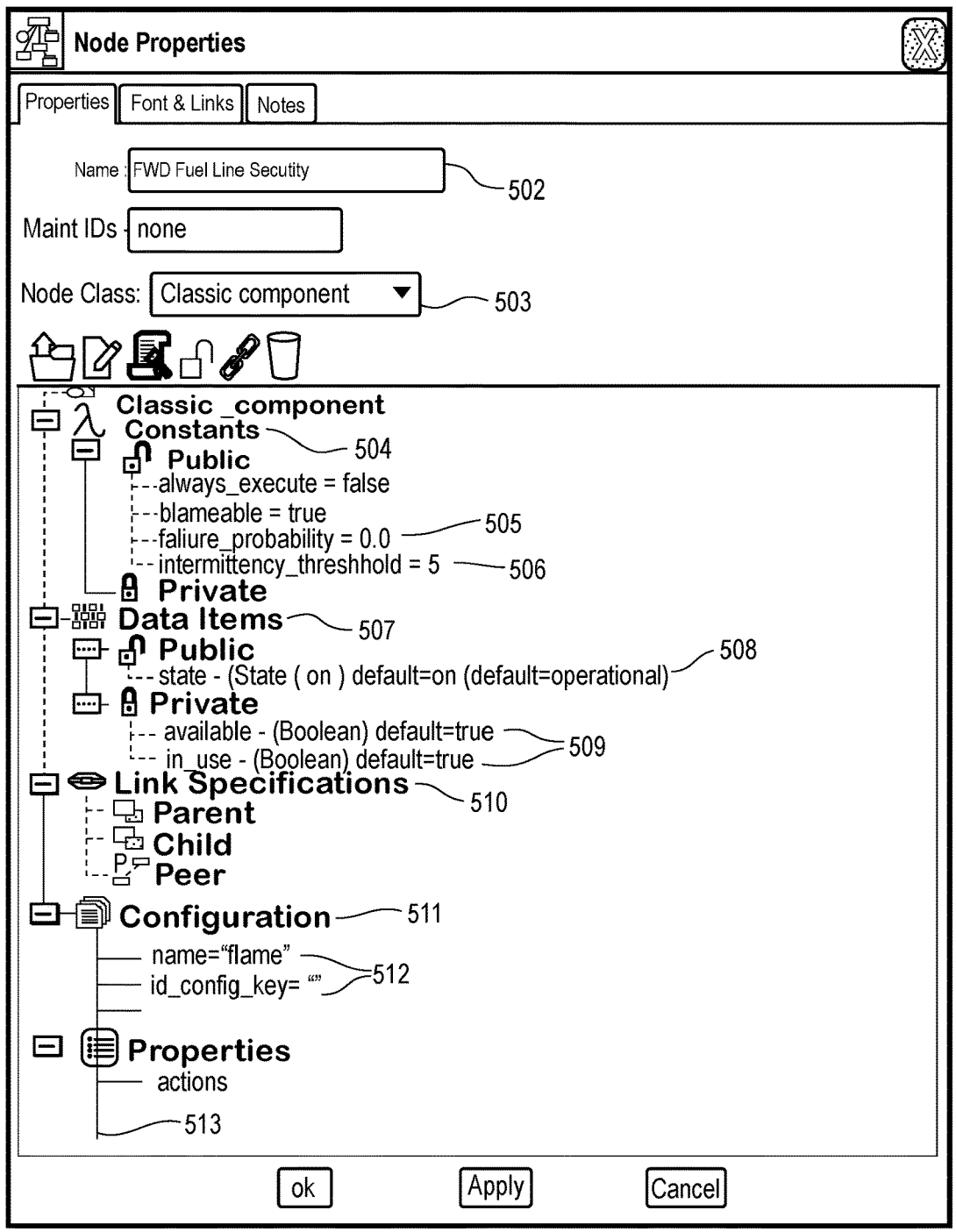

FIG. 9

```
911 ── ?xml version = "1.0" endoding = 'UTF-8"?>
912 ── <target_hardware_spec>
913 ── <hardware_element_1>
         id_LCN=""
         serial_number=""
         name=""
         description=""
         version=""
         firmware_version=""
         date_first_installed=""
         date_reinstalled=""
         date_updated=""
         spec_version=""
         spec_last_update=""
914 ──── <dimension>...</dimension>
914A ─── <IC-list> ...</IC_list>
915 ──── <block_list>
             <block>
               <register>
                 ...
                 <bit_field_list>
                 ...
               </register>
             </block>
         </block_list>
916 ──── <calibration> ...</calibration>
917 ──── <target_config>...</target_config>
918 ──── <input_interface>...</input_interface>
919 ──── <output_interface>...</output_interface>
         </hardware_element_1>
         <hardware_element_2>
           ...
         </hardware_element_2>
         ...
         <hardware_element_N>
           ...
         </hardware_element_N>
920 ── </hardware_spec>
```

900 (figure label)
901 (bracket label)

FIG. 9
CONTINUED

```
921 ── <target_software_spec>
922 ── <SW_1>
          id=""
          name=""
          description=""
          version=""
902 ──   date_first_installed=""
          date_reinstalled=""
          date_updated=""
          spec_version=""
          spec_last_update=""
          language=""
          configuration_info=""
          SLOC=""
923 ──   <class>
            id=""
            name=""
924 ──     <method>
              model=""
              id=""
              name=""
              function=""
925 ──       <input_interface
                ...
                <address> ...</address>
                <data> ...</data>
              </input_interface>
926 ──       <output_interface>
                ...
                <address> ...</address>
                <data> ...</data>
              </output_interface>
              ...
927 ──       <states> ...</states>
928 ──       <modes> ...</modes>
              ...
            </method>
            <method> ··· </method>
929 ──     <constraint>
              ...
            </constraint>
930 ──     <rules> ...</rules>
          ...
```

FIG. 9
CONTINUED

```
931 ─── <runtime>
           id=""
932 ───     <requires>
              ...
            </requires>
933 ───     <properties>
              ...
            </properties>
934 ───     <dependencies>
              ...
            </dependencies>
935 ───     <behaviors>
              ...
              <actions>
                ...
              </actions>
              <interfaces>
                ...
              </interfaces>
              <invariance>
                ...
              </invariance>
              <bindings>
                <static>
                  ...
                </static>
                <dynamic>
                  ...
                <dynamic>
                  ...
              <bindings>
                ...
              <behaviors>
936 ───     <deterministic>
              ...
            </deterministic>
937 ───     <eventdriven>
              ...
            </eventdriven>
              ...
938 ───  </runtime>
```

```
939 — <OS_spec>
940 —     <definitions>
              ...
941 —         <types>
                  ...
              </types>
942 —         <interfaces>
                  ...
              </interfaces>
943 —         <bindings>
                  ...
              </bindings>
944 —         <services>
                  ...
              </services>
          </definitions>
945 —     <properties>
904 —         ...
          </properties>
          ...
946 — </OS_specs>
      ...
947 — </SW_1>
      <SW_2> ... </SW_2>
      ...
948 — <SW_N> ... </SW_N>
      ...
949 — </Target Software System Module>
```

Left box (1001):
- 1011 `<cybersecurity_specs>`
- 1012 `<signatures>`
- 1013 `<virus_1>`
- 1014 `<properties>`
  - `name="flame"`
  - `id_config_key ="`"
  - `time_config_key ="`"
  - `log_percentages ="`"
  - `version_key_config ="`"
  - `IP_time_config ="`"
  - `IP_check_key ="`"
  - `BPS_config ="`"
  - `BPS_key ="`"
  - `proxy_server_key ="`"
  - `getVirusId=function()`
  - ...
  - `</properties>`
- 1015 `<behaviors>`
- 1016 `<actions>`
  - ...
  - `</actions>`
  - ...
  - `</behaviors>`
- 1017 `<virus_1>...</virus_1>`
  - ...
- 1018 `<virus_N>...</virus_N>`
  - `</signatures>`

Right box:
- 1019 `<postures>`
- 1020 `<protect>`
  - ...
  - `<rules>`
  - ...
  - `</rules>`
  - `</protect>`
- 1021 `<monitor> ... </monitor>`
- 1022 `<respond> ... </respond>`
- 1023 `<recover> ... </recover>`
  - `</postures>`
- 1024 `<CCExec_self_health>`
  - `id="`"
  - `name="`"
  - `description="`"
  - `version="`"
  - `language="`"
- 1025 `<properties> ... </properties>`
- 1026 `<behaviors>`
  - `<actions> ... </actions>`
  - ...
  - `</behaviors>`
- 1027 `<operations> ... </operations>`
- 1028 `<health>`
- 1029 `<heartbeat> ... </heartbeat>`
- 1030 `</health>`
- 1031 `<CCExec_self_health>`
- 1032 `</cybersecurity_spec>`

ADAPTIVE CYBERSECURITY FOR VEHICLES

TECHNICAL FIELD

Embodiments of the present invention are related to providing cybersecurity at a component level for complex vehicles, e.g., aircraft. The embodiments are especially, but not exclusively, adapted to identify cybersecurity associated with hardware components.

BACKGROUND

Providing cybersecurity for complex systems, such as vehicles, aircraft, spacecraft and other systems, represents a technical challenge as well as a significant cost. Cybersecurity measures are typically oriented towards threats to the software utilized to provide instructions to a microprocessor. For example, cybersecurity associated with software used to control/operate a vehicle is described in U.S. Pat. No. 10,089,214 entitled "AUTOMATED DETECTION OF FAULTS IN TARGET SOFTWARE AND TARGET SOFTWARE RECOVERY FROM SOME FAULTS DURING CONTINUING EXECUTION OF TARGET SOFTWARE", granted Oct. 2, 2018.

Complex vehicles, such as aircraft, are made up of hundreds if not thousands of hardware components, e.g., line replacement units (LRU), and subsystems. As used herein, "hardware" subsystems/components refer to physical specialized apparatus that perform a task associated with the physical apparatus as opposed to components that have a primary function of controlling other components. For example, hardware components for an aircraft include water and fuel pumps, landing gear, engine components, mechanical control units such as for actuators, ailerons and flaps, etc. On-aircraft operational systems that include a microprocessor, e.g., a flight control computer, that have a primary function of controlling other components are not hardware as used herein.

It is increasingly common for hardware components to also contain a microprocessor that operate under the control of software stored in the hardware component to provide control of the functionality of the hardware component. An aircraft fuel pump is an example of such a hardware component. Internal sensors associated with various parameters, e.g., fuel flowing through the pump, power supplied to the pump motor, heat of the motor and bearings, etc., provide data that allows the self-contained microprocessor to determine the operational status of the pump and generate instructions to other fuel pump elements to regulate the flow of fuel by controlling the power to the fuel pump motor which controls the revolutions-per-minute of the driven impeller. The self-contained microprocessor in the fuel pump, in response to instructions received from the flight control system requesting more engine thrust, increases the flow of fuel output from the fuel pump to accommodate the requested increase of engine thrust. The self-contained microprocessor of the fuel pump may also contain locally stored instructions associated with monitoring the operational health of the fuel pump by monitoring for operating conditions that fall outside normal parameters, e.g., heat of the motor and bearings, flow rate versus power to the motor, etc. Each hardware component provides its own function in the overall operation of the vehicle. In the case of an aircraft, failure of some hardware components may seriously impair the ability of the aircraft to remain in flight.

Cybersecurity is becoming an increasing concern for hardware components, and especially for those hardware components that contain microprocessors. A malicious actor that obtains access to the hardware component, directly or remotely via data communication, could alter the microprocessor instructions stored in the hardware component to cause abnormal operation or a functional failure under certain conditions or at predetermined times, or report to the flight control system and an Integrated Vehicle Health Management (IVHM) system, if one is available, that the hardware component is functioning in an abnormal manner while the hardware component is actually functioning normally. This abnormal operation would be recognized by an IVHM system as a false alarm or a potential failure but not as a cybersecurity event. For a military aircraft, this could cause a mission to be aborted or cause a significant failure of the hardware component and potentially seriously impair the flight of the aircraft. Similar concerns exist for other types of vehicles, e.g., cars especially with self-driving capabilities, etc. Therefore, there exists a need for improved cybersecurity for hardware components associated with complex vehicles.

Additionally, the configuration of all hardware elements, including integral associated software, if any, on an aircraft is an additional factor. Unauthorized changes in configuration may be caused by a malicious actor, i.e., bit encryption in hardware elements and input/output values in hardware and integral software. Thus, there exists a need for protection of hardware against cybersecurity threats.

SUMMARY

One object of embodiments of the present invention is to minimize the possibility of an undetected malicious cybersecurity breach associated with a hardware component in a complex hardware structure such as a vehicle, especially but not limited to, an aircraft.

Another object of one embodiment of the present invention is the identification of unauthorized changes in configuration of hardware elements including integral software on a vehicle.

Another object of one embodiment of the present invention is to identify a potentially malicious cybersecurity breach associated with a hardware component in a vehicle by distinguishing whether an anomaly associated with the hardware component is due to a cybersecurity threat or is a naturally occurring degraded performance of the hardware component such as due to wear.

An embodiment of a method, implemented by a computing system on-board a vehicle, differentiates whether an anomaly originating from a hardware component of the vehicle is caused by a cybersecurity threat, by a degradation of the performance of the hardware component, or by both. States of the respective nodes in a first group of nodes of the first hardware component are compared with a stored table of sets of states of nodes in the first group. A determination is made of whether the anomaly associated with the first hardware component is caused by a cybersecurity threat or by health degradation of the first hardware component based on the comparison of the states of the nodes of the first group with the sets of possible states of the respective nodes where each set is associated with one of a cybersecurity threat and health degradation.

DESCRIPTION OF THE DRAWINGS

Exemplary embodiments of the present invention are described below with reference to the accompanying drawings in order to better understand the operation of the embodiments of the present invention in which:

FIG. 5 shows exemplary stored, user-defined parameters for a security node.

FIG. 9 shows exemplary CCMBR model specifications for the hardware elements 901, software 902 and 903, and operating system 904.

FIG. 10 shows an exemplary cybersecurity specification which provides cybersecurity information for the hardware elements including its integral software and cybersecurity software engine self-health.

DETAILED DESCRIPTION

Figure 1:
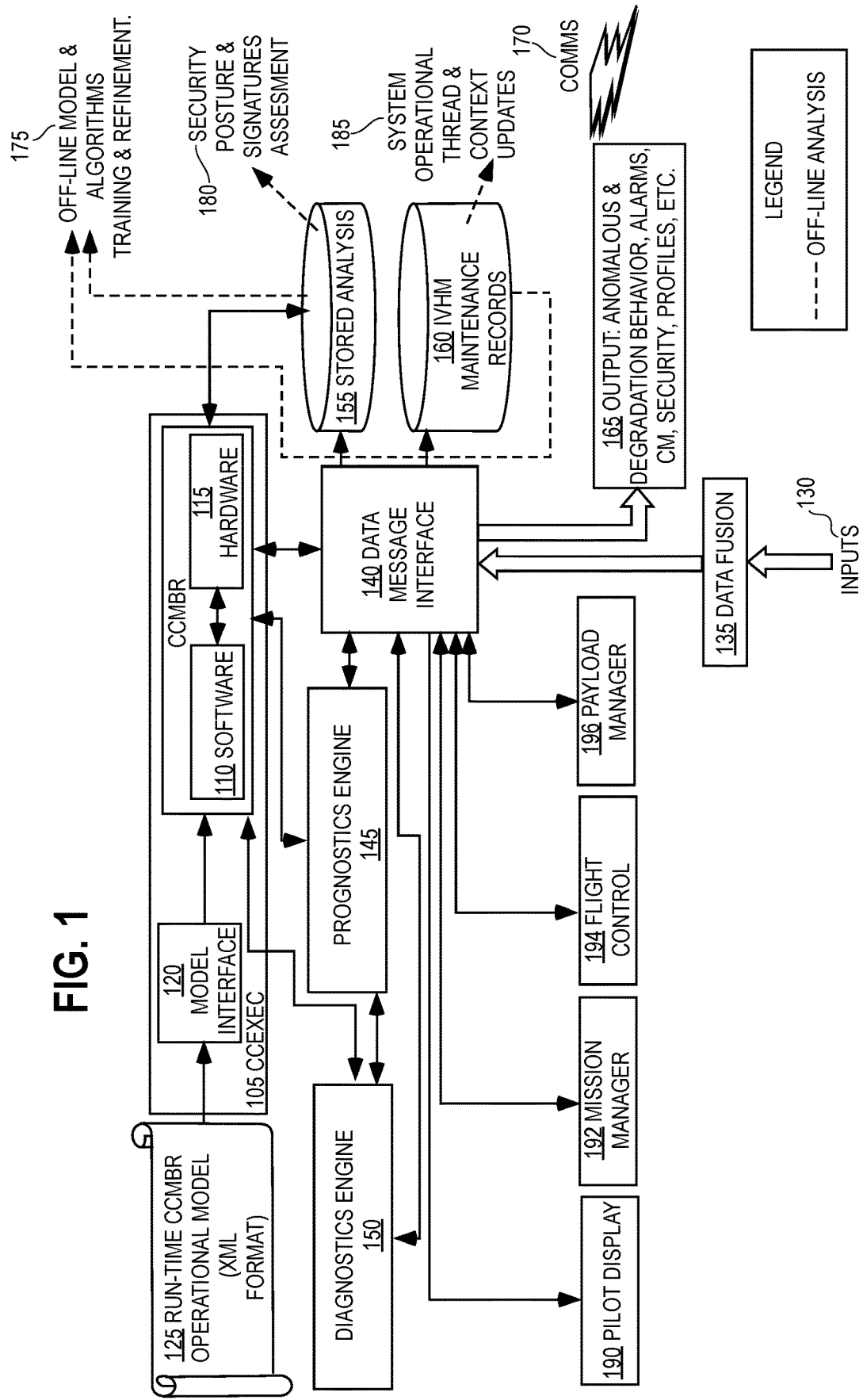
FIG. 1 shows a block diagram of an exemplary on-board system that incorporates cybersecurity analysis of hardware components in an aircraft.

FIG. 1 is a block diagram of an exemplary on-board avionics system 100 that incorporates cybersecurity analysis of components on an aircraft. A Cybersecurity Configuration Executive (CCExec) 105 includes a software Cybersecurity Configuration Model Based Reasoner (CCMBR) 110 for analysis and detection of software-based cybersecurity threats and a hardware CCMBR 115 for analysis and detection of hardware-based cybersecurity threats. A model interface 120 selects an appropriate model such as contained in an XML file from the CCMBR operational model storage 125 that contains a plurality of operational models corresponding to the various software and hardware components to be analyzed by the software CCMBR 110 and hardware CCMBR 115. The model interface 120 loads the model corresponding to the component to be analyzed into the corresponding software or hardware CCMBR module. An exemplary software CCMBR 110 is described in U.S. Pat. No. 10,089,214, which is incorporated herein by reference. Summarizing, the software CCMBR 110 monitors the microprocessor instructions not currently being executed as well as the instructions that are currently being executed for cybersecurity anomalies and threats. The hardware CCMBR 115, which is described in more detail below, seeks to detect and identify cybersecurity threats associated with hardware components. Such threats may result from an altered configuration of a mechanical device or from a malicious alteration of operational parameters or instructions integral with the mechanical device, which may include locally stored software instructions for a microprocessor which is part of and controls the operation of the mechanical device.

Inputs 130 contain information represented as data obtained from a variety of sources associated with the operation of the aircraft containing the onboard avionics system 100. For example, the inputs 130 would include real-time sensor data associated with a plurality of different components, built-in test (BIT) data, parametric data, information from analog and discrete devices, as well as operational information such as mission parameters. A data fusion module 135 transforms the various input data formats and data rates into a standardized data output provided to the data message interface 140. A description of exemplary data fusion is provided in U.S. Pat. No. 10,725,463, which is incorporated herein by reference. The data message interface 140 integrates the output from data fusion 135 with other inputs and outputs as shown in FIG. 1. It has a primary purpose of converting the data received from data fusion module 135 for transmission to the CCExec 105, prognostics module 145 and diagnostics module 150 in the respective data formats used by these modules and converting data received from each of CCExec 105, prognostics module 145 and diagnostics module 150 into formats compatible with the others of these modules, thus promoting communications among these modules. It also receives analyzed data and alarms from these three modules and transmits these for storage in the cybersecurity and analysis database "Stored Analysis" 155 as well as receiving diagnostics and prognostics metrics that are transmitted for storage in the Integrated Vehicle Health Management (IVHM) maintenance records database 160. In addition to the diagnostic and prognostic analysis data and metrics, the data from data fusion module 135 upon which such diagnostics and prognostics analysis was based is also stored in database 160. The data from the data message interface to database 160 is timestamped permitting the replay of fault data and degradation events allowing mission and maintenance personnel an opportunity for further analysis and learning. Similarly, the timestamped data stored in module 155 allows for a later replay of cybersecurity and configuration changing events. The data message interface 140 also provides real-time analyzed data and alarms for mission operations to output module 165 which provides real-time communications 170 for either manned and unmanned aircraft for transmission to ground-based control station and operations center. During post flight and off-line analysis, stored information extracted from cybersecurity database 155 and IVHM database 160 are used for off-line model and algorithm training and refinement, i.e., via line 175 during off-board analysis. This data also includes security, posture and signatures assessment via line 180 for off-board analysis. Similarly, during post flight and off-line analysis, IVHM maintenance data stored in database 160 is extracted for off-board analysis of system fault, failures, false alarms, and degradation events and system operational threads and updates via line 185. Various physical transport of database SSDs 155 and 160, and wire, optical or wireless data transmission techniques (while connected to the aircraft offline), can be used to support the transmission of data via lines 180 and 185.

The data message interface 140 also provides alarms and analyzed data to the pilot display 190 on either manned aircraft for viewing by the on-board pilot or unmanned mission display to the ground control mission operator via 165 and COMMS 170. The mission manager 192 transmits mission profiles and mission data to the data message interface 140 to be formatted for compatibility and transmission to the CCExec 105, prognostics engine/module 145 and the diagnostics engine/module 150. The data message interface 140 receives analyzed data and passes equipment failure and degradation data and associated security risks to the onboard/offboard (for manned/unmanned aircrafts) flight control 194 system. BIT and warnings, cautions or advisories (WCA) data from the flight control 194 are transmitted by the data message interface 140 to the diagnostics module 150 and the prognostics module 145 for comparison. This confirmation produces better accuracy on anomalous events. Similarly, payload manager 196 passes sensor data related to payloads, e.g., radar, weapons, etc., to the data message interface 140 for transmission to the CCExec 105, prognostics module 145 and diagnostics module 150. The payload manager 196 receives analyzed data from those modules for the potential issuance of control and/or alert commands dependent on the received alarms and risks contained in the analyzed data.

Prior to focusing on the hardware CCMBR module 115, it will be observed from FIG. 1 that CCMBR module 115 operates in cooperation with diagnostics information for components received from diagnostics module 150 and the projected health information for a component provided by prognostics module 145. This information, especially the diagnostics information, provides the hardware CCMBR module 115 with information that is utilized in making a determination by the CCMBR module 115 of whether an anomaly or unexpected parameter value associated with a particular hardware component is due to a component degradation or failure such as from normal wear or other environmental impacts, BIT false alarms, or is due to a cybersecurity threat. A suitable diagnostics module 150 is disclosed in U.S. Pat. No. 10,676,048 entitled "PARAMETRIC DATA MODELING FOR MODEL BASED REASONERS", issued Jun. 9, 2020 which describes an IVHMExec 104 that includes a diagnostics model-based reasoner (MBR) engine 106; this patent is incorporated herein by reference. A suitable prognostics module 145 is disclosed in U.S. Pat. No. 10,814,883, entitled "PROGNOSTICS FOR IMPROVED MAINTENANCE OF VEHICLES", issued Oct. 27, 2020, which describes a system in which the projected health of components is determined such as shown in FIG. 26 and described in the accompanying text; this patent is incorporated herein by reference. Similarly, a suitable data fusion module 135 is disclosed in U.S. Pat. No. 10,725,463, entitled "HIGH-FREQUENCY SENSOR DATA ANALYSIS AND INTEGRATED WITH LOW FREQUENCY SENSOR DATA USED FOR PARAMETRIC DATA MODELING FOR MODEL BASED REASONERS", issued Jul. 28, 2020, which describes how different types of data can be converted into, i.e., fused, common data format such as shown in its FIGS. 11-13 and described in the corresponding text; this patent is incorporated herein by reference. The systems and teachings of these incorporated patents represent exemplary embodiments that provide information utilized in support of the hardware CCMBR 115. However, as will be understood by those skilled in the art, systems and methods other than described in these incorporated patents could be utilized to provide such information to the hardware CCMBR 115.

Figure 2:
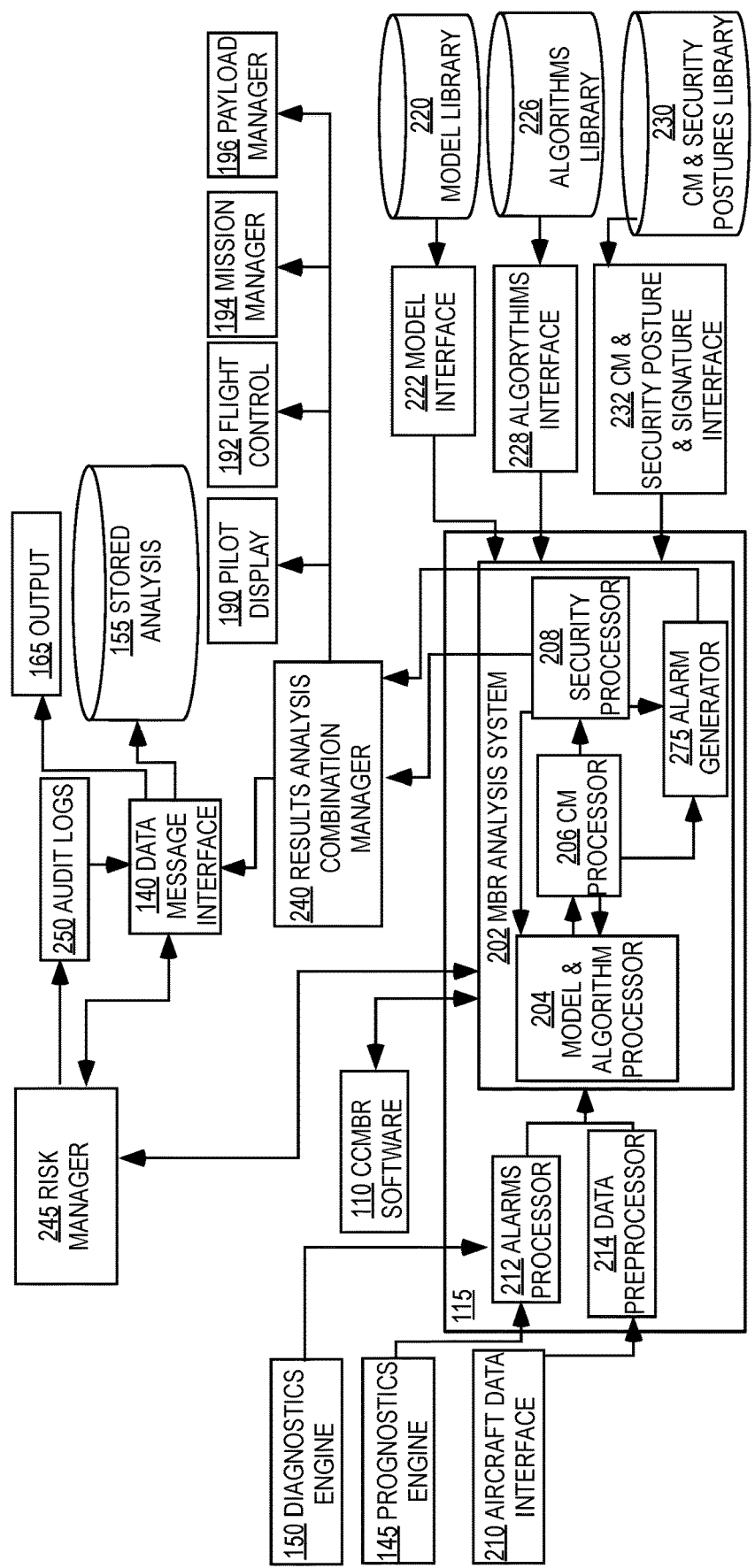
FIG. 2 shows a block diagram of an exemplary on-board cybersecurity system and exemplary supporting elements.

FIG. 2 is a block diagram of an exemplary on-board cybersecurity system 200 that includes CCMBR hardware module 115 and exemplary supporting elements. The hardware CCMBR module 115 includes a CCMBR analysis system 202 that itself includes a model and algorithm processor 204, a configuration manager (CM) processor 206, a security processor 208 and an alarm generator 275. An alarms processor 212 receives and processes alarms and associated alarm data as received from the diagnostics module 150 and the prognostics module 145. A data preprocessor 214 acquires line replacement unit (LRU) data associated with the corresponding alarms through an aircraft data interface 210 that has access to the LRU by an aircraft data bus. The MBR analysis system 202 (for hardware) may be implemented by a dedicated microprocessing system or may be implemented as a timeshared function on a microprocessing system that serves other functions, e.g., a fuel pump system. In order to process an alarm and corresponding data associated from an LRU, the model and algorithm processor 204 will acquire a corresponding LRU model, associated LRU algorithms, associated security, and associated configuration information. The LRU models are stored in the model library 220 with the model interface 222 providing the associated XML file representing the appropriate LRU model to the model and algorithm processor 204. The corresponding LRU algorithms are obtained from the algorithms library 226, which contains the algorithms utilized with the LRU models and transmitted to the model and algorithm processor 204 by the algorithm interface 228. The security information associated with the subject LRU includes the LRU configuration elements and security postures including a security signature from the library of database 230 as transmitted by the CM and security posture and signature interface module 232 to the CM processor 206 and the security processor 208, respectively. Depending on the determinations made by the CM processor 206 and the security processor 208, inputs to the alarm generator 210 will cause the generation of an alarm transmitted to the results analysis and combination manager 240.

Alarms are received by Results Analysis Combination Module 240 from Alarm Generator 275 while analyzed data cybersecurity data is received from MBR Analysis System Module 202. Module 240 receives analyzed discrimination data between IVHM and cybersecurity faults and failures. It also receives risk analysis data from Risk Manager Module 245. Module 240 determines the next course of action to be performed on the infected target software of the hardware and/or hardware. For instance, these actions could include delete memory contents from volatile memory in a specific address range(s) and continue with target HW/SW operations, delete infected relevant files from non-volatile memory, disinfect non-volatile and volatile memories, delete verified viruses, worms, and Trojans from non-volatile and volatile memory, limit I/O to specified design parameters (i.e., allocated design variables) at software function and class level, restricted channel bandwidth communication, restricted API usage, inform and record/store all actions to mission operators and maintainers, and others. The risk assessment & classification performed in Module 245 (i.e., by the process and determinations in Risk Evaluation & Estimate Risk Level 725 (see FIG. 7) risk level is essential for taking the necessary actions). The higher the risk level (from 1 to 3; 1=low, 2=medium, 3=high) the more significant and time critical the action taken on the target HW/SW. The Alarm Generator 275 generates HW element alarms and transmits these to the Module 240 for collection along with those alarms generated by Module 110. These are displayed on the Pilot Display 190 & Mission Manager 194 for pilot/mission operator to make decisions on continuation of the mission. Alarms to Flight Control 192 and Payload Manager 196 provide additional information for making automated decisions on flight path and mission planning. Alarms and analyzed data are then collected via Module 140 in Modules 155 & 160 for cybersecurity and IVHM related information, respectively.

The risk manager 245 receives information from the CCMBR analysis system 202 performs a risk assessment and vulnerability analysis on sensed attacks. It is a case-based manager that stores information on cases of known/existing vulnerabilities and adds new vulnerabilities as they are discovered. Existing vulnerabilities and corresponding recovery actions are stored in database 155 and transmitted by data interface 140 to the CCMBR analysis system 202 for the implementation of corresponding recovery actions. New vulnerability cases are also stored in database 155 via data interface 140 from the risk manager 245. Audit logs 250 are stored to provide a record of actions taken by the risk manager 245.

Risk Manager 245 performs risk assessment & vulnerability analysis on system breaches and attacks. It is a case-based manager, and provides information on cases of existing vulnerabilities to defend against and register new cases to defend against. Existing/prior vulnerability cases & risks are provided to Modules 110 & 115 for analysis of actionable response & recovery from Module 155 Stored Analysis via 140 Data Message Interface. New cases (threat situations) are formed within Module 245 and immediately distributed to Modules 110 & 115 and they are also stored in Module 155 via Module 140. These cases are developed during a human assisted modeling/design process.

Figure 7:
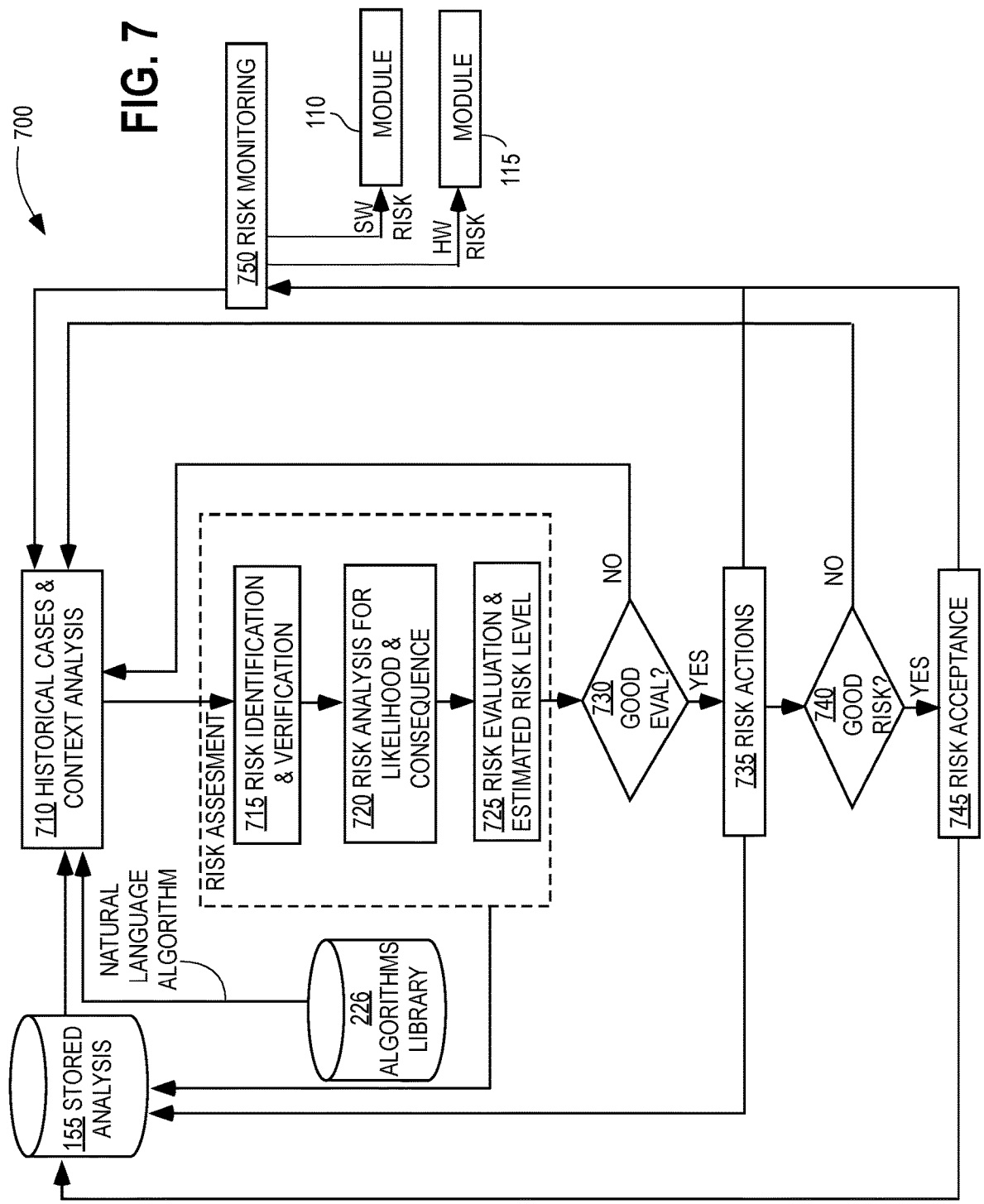
FIG. 7 shows a process of risk determination and management as performed by the Risk Manager.

The general process of risk determination and management is performed in 245. Risk Manager and is described in FIG. 7 by Flowchart 700. The Risk level determined in 725. Risk Evaluation & Estimate Risk Level ranges from an indicator of 1 to 3; 1=low, 2=medium, and 3=high. Resulting actions against cybersecurity threats are taken in Module 240 with risk level information provided to this module. In FIG. 7, existing/prior vulnerability cases & risks are provided to Historical Cases & Context Analysis 710 from database 155. Context analysis refers to reduction of "clear text" in English cases via natural language algorithms obtained from Algorithms Library 226 for further "Risk Assessment". These are searched and compared against new cybersecurity incidents via use of pertinent algorithms from the Algorithms Library 226. If these cybersecurity incidents refer to existing VWT signatures, they are identified, verified, and analyzed for differences between historical and new cybersecurity incidents in Risk Identification & Verification 715. Otherwise, the same process occurs for unknown unseen VWT signatures. VWT is further analyzed for their exposure to system services (communication protocols, interfaces, etc.) and their likelihood & all possible consequence scenarios in Risk Analysis For Likelihood & Consequence 720 and monitored in Risk Monitoring 750 for further single to cascading exposures from one service to another. If risk evaluation in Good Eval? 730 is in good in comparison with signatures, boundaries, and profiles of previous similar evaluations, does not violate the PMMR posture, and other control measures, it is processed for Risk Actions 735, otherwise the incident/event is fed back to Historical Cases & Context Analysis 710 with new information for further analysis. Risk Actions 735 may include risk mitigation strategies, countermeasures operations (may include closures of pathways, deletion of data in volatile and non-volatile memory, safeguard from allocation of memory in future events, etc.), and other actions allowed by the PMMR posture described in FIG. 8. Risk actions are stored in database 155. If there is seen to be any further associated residual risks in Good Risk? 740, the risk is fed back to Historical Cases & Context Analysis 710 for further treatment. Otherwise, the risk if verified for acceptance in Risk Acceptance 545 and stored in database 155. These include updates to existing & new signatures and profiles for future use. An accepted risk is monitored for any further exposure to the system in Risk Monitoring 750. All pertinent algorithms for risk assessment, risk acceptance, and risk monitoring are obtained from Algorithms Library 226. Software risks are transmitted to Module 110 and hardware risks are transmitted to Module 115, respectively, for further analysis.

Figure 3:
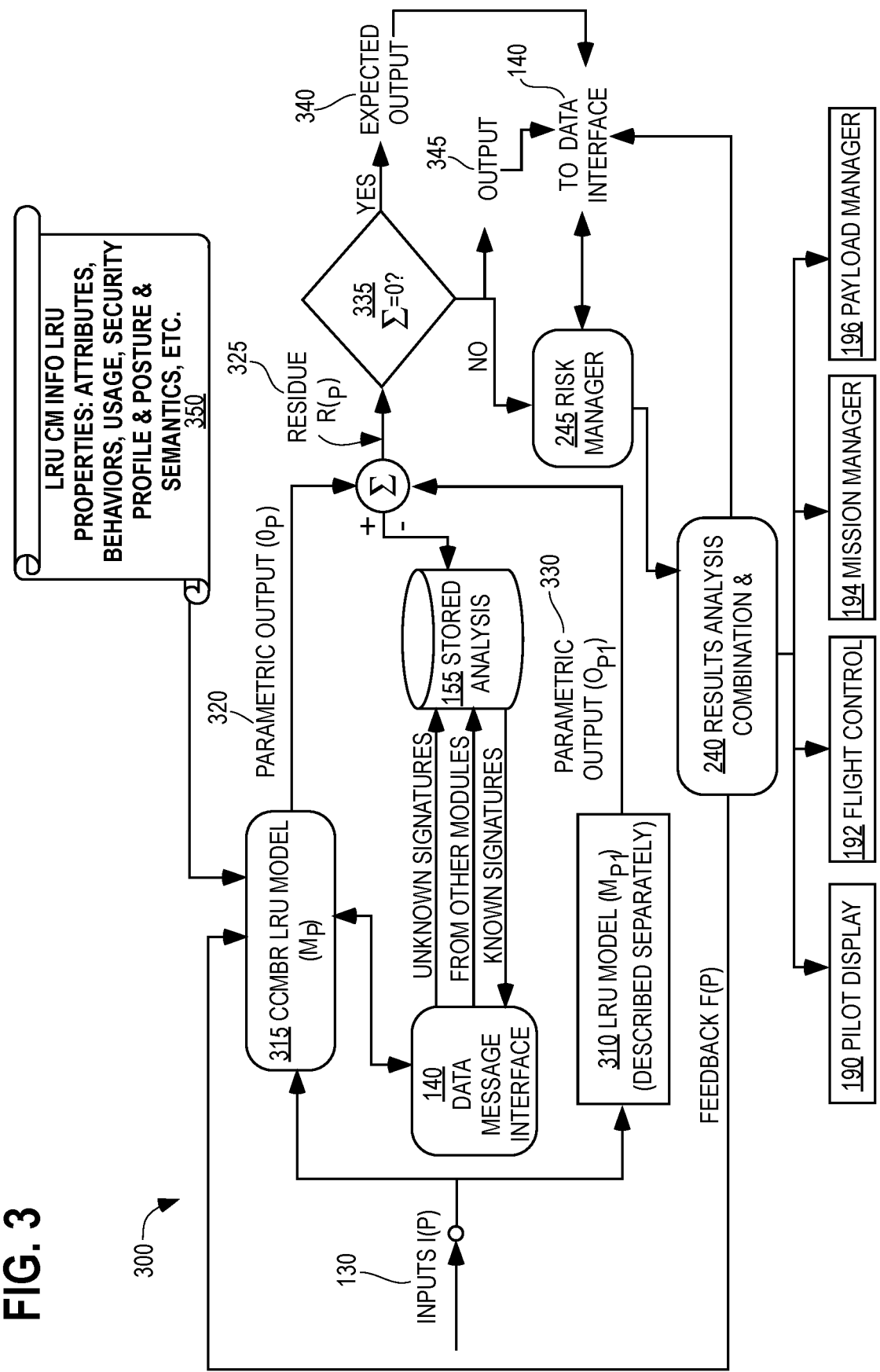
FIG. 3 shows a diagram of an exemplary model of a line replacement unit (LRU) and a method for assessment for a cybersecurity threat.

FIG. 3 shows a block diagram that focuses on an exemplary cybersecurity threat assessment model for a line replacement unit (LRU). Inputs 130 represents data from data fusion 135 and consists of digital data and sensed information coming from or associated with an LRU to be analyzed. A CCMBR LRU model 315 operates in parallel with an LRU model 310, with CCMBR LRU model 315 receiving cybersecurity relevant data from the subject LRU and LRU model 310 receiving measured and sensed data for the LRU for degradation analysis. Each of model 315 and 310 provides respective outputs 320 and 330. The output 320 is a comparison of the received cybersecurity data with corresponding stored cybersecurity data for the LRU. The output 330 ($Op_1$) is a comparison of the received data representing a physical system model of the LRU with corresponding physics based and empirical models. Outputs 320 and 330 represent respective residues, if any, for cybersecurity differences and operational degradation differences, respectively. These outputs are combined at a summation node 325. For example, a zero or near zero residue for output 320 would indicate no cybersecurity concerns or threats; a zero or near zero residue for output 330 would indicate no significant operational degradation from expected performance, so that both outputs at or near zero indicates no anomalous behavior. The stored analysis database 155 stores VWT signatures with the signatures being obtained through data interface 140 for the CCMBR LRU model 315. The database 230 also supplies known signatures via data interface 232 to the CCMBR LRU model 315. Known signatures are represented in the model as shown in FIG. 10 by lines 1012 to 1018.

A summation module 335 makes a determination of whether the respective residues are zero or an acceptably small value. A YES determination at output 340 indicates the analysis of the LRU to be an expected result, i.e., the zero or nearly zero respective residues indicating that the LRU does not have a detectable cybersecurity anomaly/risk and operating at acceptable performance, i.e., no undue degradation or anomalous behavior. A NO determination at output 345 from module 335 is indicative of: a potentially detectable cybersecurity risk, potential operational degradation/fault/failure or both. This information is coupled by the data interface 140 to storage in database 155, and is also transmitted to the risk manager 245.

Database 155 represents a plurality of cybersecurity-related information relevant to the subject hardware element, e.g., LRU, under analysis. The CCMBR LRU model 315 is implemented by the CCMBR Analysis System 202. Referring to FIG. 2, a model of the subject LRU is obtained by the module 202 from the model library 220; an algorithm relating to the operation of the subject LRU is obtained from the algorithms library 226; and CM and security postures for the relevant LRU are obtained from the CM and security postures library 230. The corresponding model, algorithm, and security information are compared with the corresponding information received or derived from data for the subject LRU. Any differences in data values or data interfaces as received from the LRU as compared with corresponding stored cybersecurity data information represents residue outputs provided on output 320 ($O_p$).

The LRU model 310 in one exemplary implementation operates as described in the text associated with FIG. 27 of U.S. Pat. No. 10,814,883, which is incorporated herein by reference. That is, the output 2750 shown in FIG. 27 of the referenced patent represents a residue, if any, of a comparison of measured parameters with corresponding parameters derived from a physics-based model and an empirical model. Output 2750 corresponds to output 330 in FIG. 3.

The residue result from $O_p$ and $O_{p1}$ can be represented mathematically as:

$$M_p = \frac{O_p(p)}{i(p)}; \quad \text{CCMBR Model}$$

$$M_{p1} = \frac{O_{p1}(p)}{i(p)}; \quad \text{IVHM Model}$$

p=parametric sensor & cybersecurity data
$O_p$, $O_{p1}$=parameteric output of Models
i(p)=input stream of parametric data $$\Sigma = R(p) = O_p(p) - O_{p1}(p) = (M_p - M_{p1}) \times i(p)$$

R(p)=Residue

A residue output of R(p)=0 implies that there were no unexpected signatures extracted from the anomalous behavior of the aircraft hardware/software elements. This means that cybersecurity output $O_p(p)$ is zero. On the other hand, a degradation/fault/failure output $O_{p1}(p)$ of zero implies that the anomalous behavior cannot be represented as IVHM (module 310) fault or failure or degradation event. Of course, a non-zero value of one of these outputs while the other output is zero provides a direct conclusion that the output with the non-zero value is the cause.

In the case when both $O_p(p)$ and $O_{p1}(p)$ outputs are non-zero, the residue R(p) will be nonzero resulting in additional analysis being required to determine the root cause of the fault and/or failure and/or degradation event. This implies that the root cause of the equipment fault and/or failure is due to security issues, IVHM (fault/failure/degradation) issues, or both.

Figure 4:
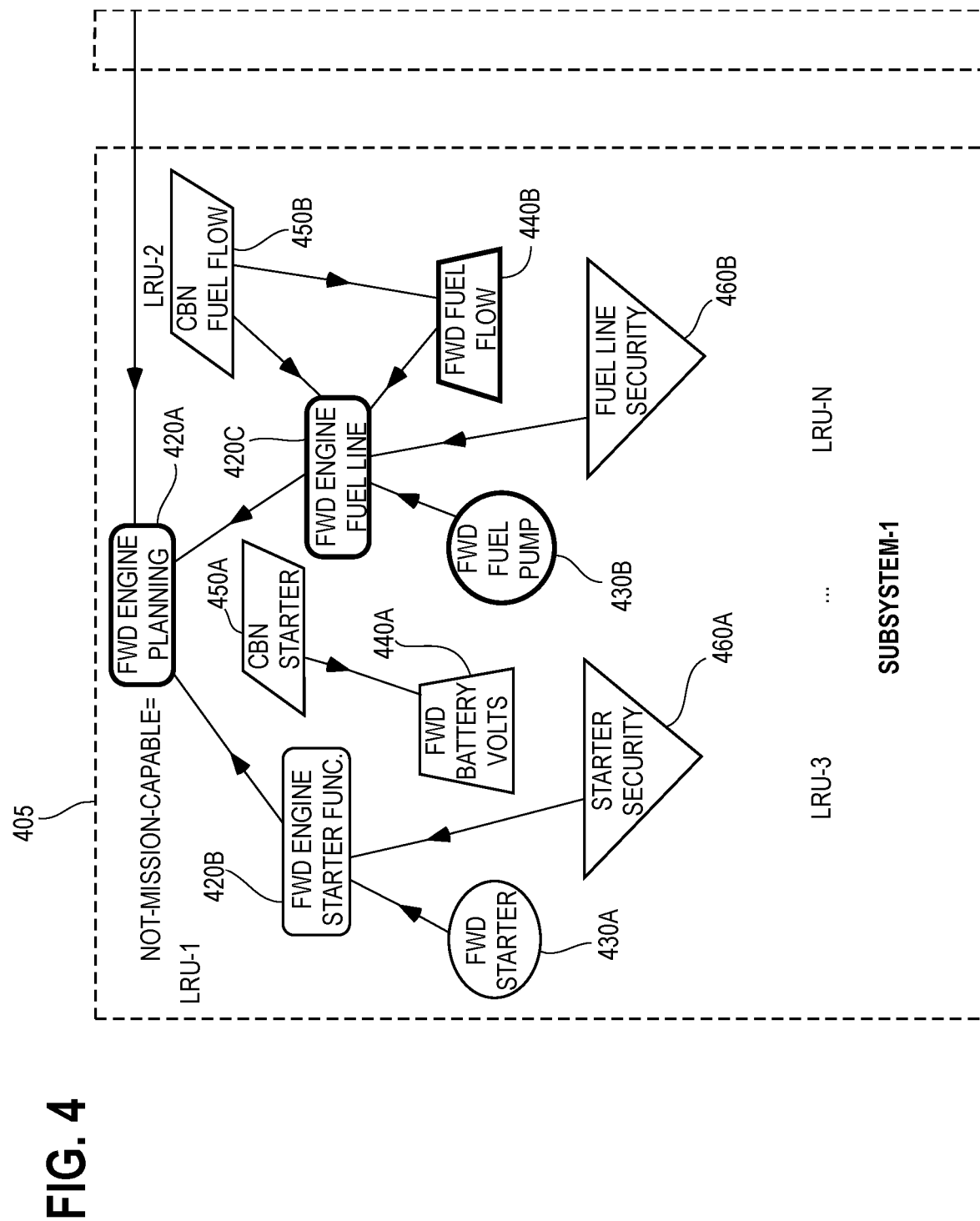
FIG. 4 shows an exemplary nodal analysis based on model-based reasoning for identifying whether an anomaly is caused by a cybersecurity threat or a health degradation or both.
Figure 4:
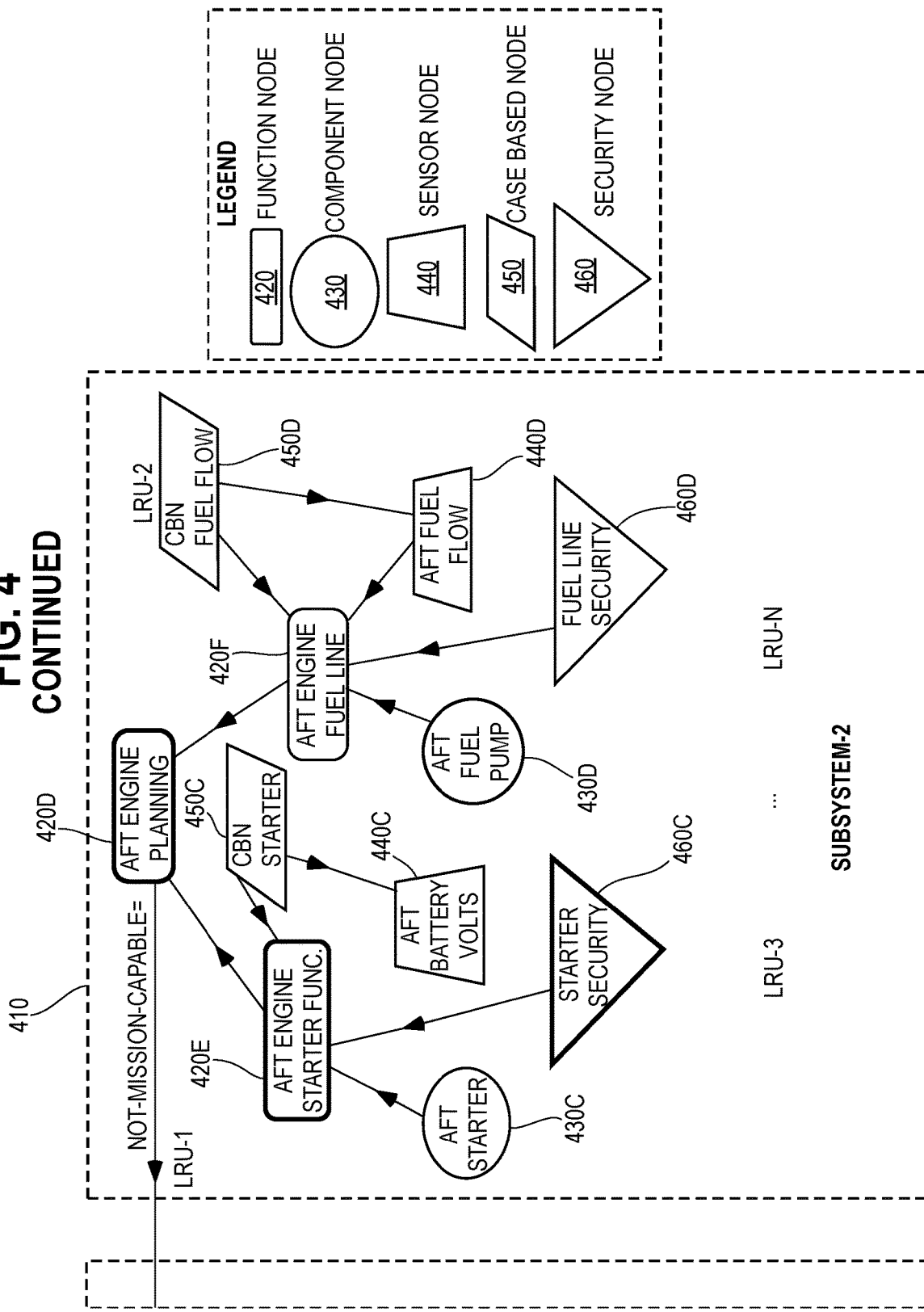

FIG. 4 shows an exemplary graphical nodal analysis performed by CCMBR 115 to determine whether an anomaly associated with a hardware component is caused by a cybersecurity threat or a health degradation. As shown in FIG. 4, exemplary CCMBR model node level top-to-bottom and bottom-to-top analyses are performed in order to identify the anomalous behaving node. In this example, a forward engine 405 and an aft engine 410 of an aircraft are represented as LRUs with nodes which are analyzed using graphical nodal analysis. CCMBR models include functional nodes 420, component nodes 430, sensor nodes 440, case-based nodes 450, and security nodes 460 as depicted in the legend in FIG. 4. Graphical node traversal accomplishes a root cause analysis with inter-correlating failure modes between LRUs and Subsystems (as shown in FIG. 4) and discriminates between faults and/or failures caused by IVHM (health fault/failure/degradation) versus a cybersecurity cause.

In FIG. 4, the forward engine 405 has IVHM caused faults and failures—the Function Node "FWD Engine Fuel Line" 420C, the Sensor Node "FWD Fuel Flow" 440B, and the Component Node "FWD Fuel Pump" 430B all indicate failures (bold outline of the respective nodes), while the Security Node "Fuel Line Security" 460B shows no failure (i.e., no cybersecurity threats or their effects upon the system). Also, the Function Node "FWD Engine Planning" 420A in forward engine 405 shows a failure (bold outline) i.e., not-mission-capable, since fuel is not available to the FWD Engine 405. Hence, the inter-dependent nodal analysis of module 405 determined that the cause of the non-zero residue in module 405 was due to health/degradation cause. Inter-dependent nodal analysis is carried out by a logical comparison of relevant sets of nodes where each set defines degradation caused fault, cybersecurity caused fault/anomaly, or both.

Graphical nodal analysis of the Function Node "AFT Engine Planning" 420D shows a failure (bold outline), i.e., not-mission-capable, since the AFT Engine 410 cannot be started with the starter fuel ignitor function 420E (i.e., not operating in the manner as prescribed) and is due to cybersecurity related issue 460C. The Sensor Node 440C is operational and provides the correct voltage to the Starter Component 450C, however, a cybersecurity attack is preventing the starter from functioning properly. For example, every time the starter relay element wants to engage, the cybersecurity attack prevents this engagement by sending an alternate command to force the relay switch to an "OFF" mode. This causes the Function Node "AFT Engine Starter Func.' 420E to fail while the Component Node "AFT Starter" 430C shows no fault/failure. Thus, nodal analysis of AFT engine 410 identified that a problem (non-zero residue) was caused by a cybersecurity cause. If both of these problems with FWD engine 405 and AFT engine 410 were to occur simultaneously, the nodal analysis of each can determine that two independent anomalies are occurring for two different causes, one a health degradation cause and the other a cybersecurity cause. With both the FWD and AFT Engines (405 and 410 respectively) being non-functional in this example for different causes, the simultaneous failure of both engines could lead to a catastrophic event for the aircraft, if in flight. Thus, graphical nodal analysis can identify whether a health degradation or cybersecurity threat is the root cause for a non-zero residue, and can also identify simultaneously occurring health degradation/fault/failures and cybersecurity threat problems that each contribute to a non-zero residue by identifying the existence of a health degradation and an independent cybersecurity threat that caused respective contributions to a non-zero residue. The graphical nodal analysis is performed by module 204 with inputs from modules 206 and 208.

An example of levels of risk are shown below in TABLE 1.

| Risk | | | Security Posture | | | |
|---|---|---|---|---|---|---|
| Level | Component/Condition | IVHM | Protect | Monitor | Response | Recover |
| 1 | Fuel Pump/Anomaly | Trigger Detection | Posture to component Level | Trigger search for VWT | | |

-continued

| Risk Level | Component/Condition | IVHM | Security Posture | | | |
|---|---|---|---|---|---|---|
| | | | Protect | Monitor | Response | Recover |
| 2 | Fuel Pump/Fault | No Evidence | Posture to component Level | Evidence of VWT effecting pump relay control (possibly spoofing) | Trigger response via Modules 110 & 115 | Recover component if possible via Modules 100, 115, 240, 245, flight & mission control |
| 3 | Fuel Pump/VWT | No Evidence | Posture to component Level | VWT - No fuel available and unable to gain relay control | Message to flight control to initiate emergency procedures for flight termination | Catastrophic event or near safe or safe landing |

For a risk level 1, a fuel pump anomaly is detected by the health management system with results in the triggering of a search for a potential VWT signature. As shown for risk level 2, a fuel pump fault has been detected, but with no evidence from the health management system of degradation or failure. Evidence is determined that a VWT signature may exist which could affect the pump relay control, or possibly spoofing of this. This gives rise to triggering a response from CCMBR 110 and 115 with the objective to recover the component, if possible. In risk level 3, the fuel pump failure is determined to be caused by an identified VWT signature with the health management system finding no evidence of a degradation-type fault. The VWT signature is associated with no fuel being available and an inability to gain control of the fuel pump relay. In this situation a response initiates a message to the flight control to initiate emergency procedures for flight termination, if and flight. With recovery of the fault not being possible, this event for an in-flight aircraft could result in a catastrophic event (i.e., loss of the aircraft) or a possible immediate near safe or safe landing depending on mission management and flight control systems response.

FIG. 5 shows various user-defined parameters for the Security Node 501 which will be seen by a modeling engineer by double-clicking on the security node icon 501, which brings up the "Node Properties" dialog window shown in FIG. 5. The parameters defined in the Node Properties include the Node Name 502, in this example "FWD Fuel Line Security", Node Class 503, default parameter values 504, and data items 507 defining the capabilities, output and status data types of node 501. Although specific labels and features are shown in FIG. 5, these will vary depending on the security node being modeled as well as inter-correlating design parameters (other nodes that: interact with the subject node, impact the subject node, or are impacted by the subject node) of a modeled aircraft.

In FIG. 5 we represent the node properties of the security node 501. The default parameter values 504, 505 indicates a failure probability (failure modes) defined by the component supplier with a "0" indicating no supplier data available. Alternatively, the failure probability can be determined from historical performance data. It can be recalculated with security incidents, i.e., the failure probability increases with security incidents. The intermittency threshold 506 refers to a time period of intermittent or random behaviors with an exemplary default value of five seconds. The state 508 defines the various states of the component, e.g. ON, OFF, high-pressure, VWT infected, stuck (for BIT nodes), intermittent, etc. The available and in use parameters 509 are shown as both being set to "true", i.e. the component is both available and in use. A "false" state in either of the parameters 509 could be due to failure and/or due to other reasons such as loss of power, due to denial of service, etc. The link specification 510 specifies links to other nodes in the model via the function nodes. Configuration 511 represents the configuration parameters 512 generated in the model XML files—in particular those shown in FIGS. 10-1014 and 1015. The Node Properties dialog will contain continuation 513 of all the parameters for 1001 and 1002 in FIG. 10, which are then generated as CCMBR models in XML format. Additional exemplary sensor node properties are shown in U.S. Pat. No. 10,676,048 FIGS. 4-6.

Figure 6:
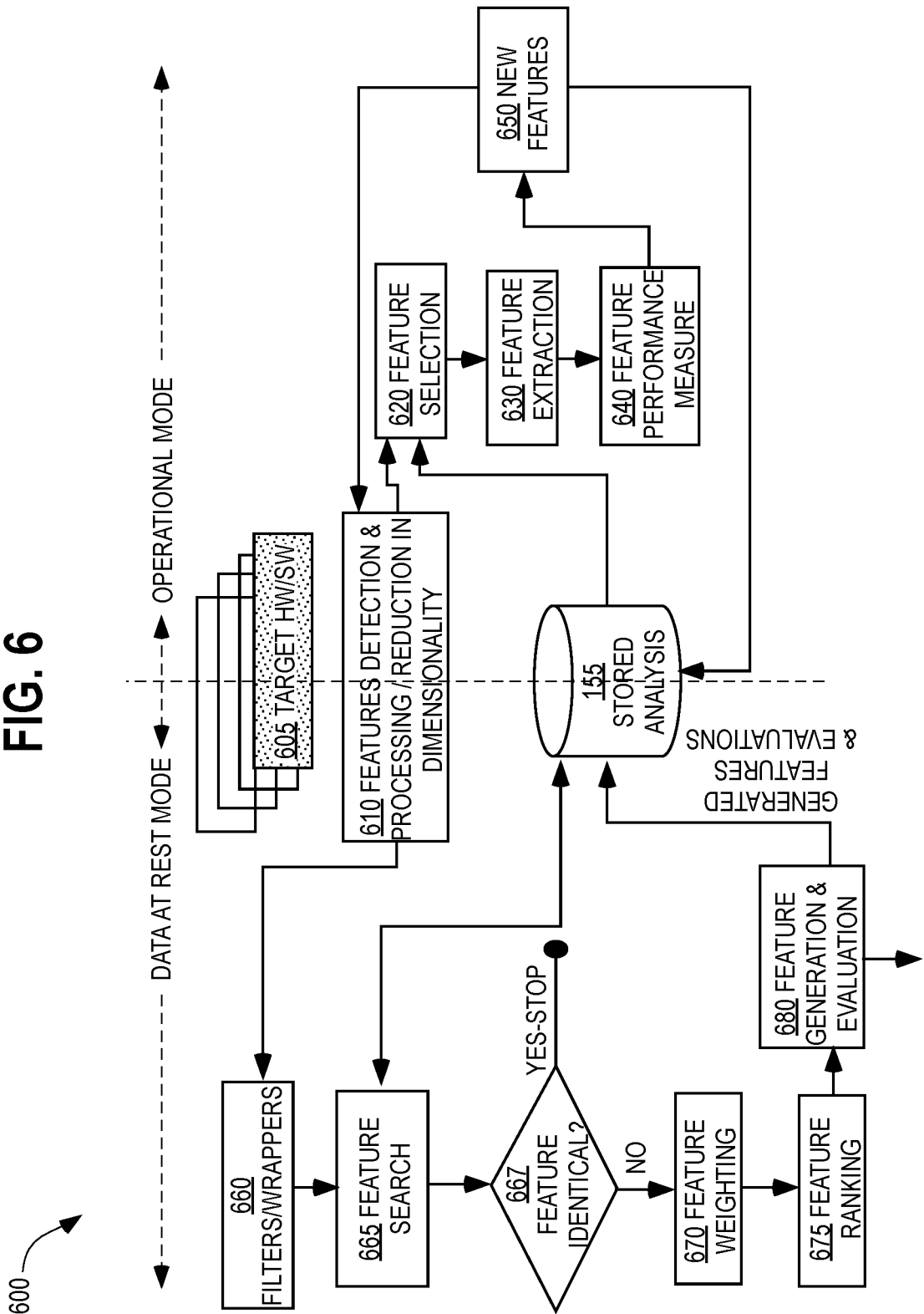
FIG. 6 shows a method of discrimination for cybersecurity or degradation causation for an anomaly based on whether the data is at rest or is in operation.

FIG. 6 shows another method of discrimination between cybersecurity or degradation causation for an anomaly. The Feature Generation & Evaluation 680 extracts features data and provides another measure for discrimination between IVHM faults/failures/degradations vs cybersecurity related faults and failures. In FIG. 6, the feature extraction mechanism for VWTs is developed. Feature extraction may be utilized in two (or more depending on the vehicle and its environment) modes of operation: 1) data at rest mode when the aircraft is on ground with electrical system operational, and 2) in the operational mode when the aircraft has pre-flight tests and subsequently is operational in flight. The flowchart for these modes is shown in FIG. 6. The data at rest mode is depicted at left side of dark dotted vertical line and in operational mode to the right side. Three elements 1) Target HW/SW 605, 2) Features Detection & Processing/Reduction in Dimensionality 610, and 3) Stored Analysis 155 are used for analysis and processing in both of these modes of operation. Data at rest operation differs from data in motion (i.e., operational mode) in that no software is invoked into volatile memory except the Hardware CCMBR engine 115, where this engine searches for infected stored (non-volatile memory) data files, i.e., Target HW/SW 605 (mostly target application software and firmware in hardware) search for VWTs. This process is the extraction of security signatures (features) of known VWTs, and more significantly, the comparison of software as designed vs software as stored data using the CCMBR Model, target software as designed configuration, number of source lines of code (SLOC) by object file decomposition as designed, the software footprint as designed, and other design attributes as described in FIGS. 9 & 10. This search during data at rest for infected data begins processing starting in Features Detection & Processing/Reduction in Dimensionality 610, next to Module Filters/Wrappers 660, completes in Module Features Generation & Evaluation 680, and terminates with extracted features and evaluation, and disinfected data stored in Stored Analysis 155 for use during data in motion. In Filters/Wrappers 660 a) statistical methods can be used for filtering and recognizing the binary patterns/features for executable files/firmware and natural language methods for recognizing XML files and clear text files. Filter methods are fast for evaluation of subset of the features but may fail to provide the best solution, whereas, b) wrapper methods (i.e., wrapper methods measure the usefulness of a subset of feature by training on the CCMBR model) utilize CCMBR models to determine the patterns/features of data at rest and can provide a subset of features. Due to well established boundaries in the CCMBR model, wrappers are easily cross validated with the CCMBR Models. Both filter and wrapper methods can be trained offline and refined to improve outcomes. In Module Feature Search 665, search is made for historical features and feature subsets extracted from Module 155 to the currently recognized features in Module 660. The search algorithms may employ for instance exponential, sequential, random, and other techniques to classify a data at rest file as infected with VWT or not. The search technique compares existing VWT signatures (e.g., Line Signatures Block 1012 in FIG. 9 with all files on the aircraft (HW/SW configuration files, software source code, etc.) for new infections. It records the analysis results in Module 155 for later use in the operational mode. If search reveals no new changes in the pattern/feature/feature subsets in Module Feature Identical? 667 from features generated in Module 660, the processing stops. All attributes are the same and an update is unnecessary. If these features/feature subsets are different, processing continues in Module Feature Weighting 670 where a dynamic weighting function sensitive to the effectiveness of features is determined. The weighting function is determined by Euclidean distance between nearest neighbor kNN features:

$$w_l^{i,j} = \frac{\min\{d^k(x_l^i, x_{kNN}^i), d^k(x_l^i, x_{kNN}^j)\}}{d^k(x_l^i, x_{kNN}^i) + d^k(x_l^i, x_{kNN}^j)}$$

$w_l^{i,j}$=weighting function
k=is a control parameter between 0 and $\infty$
$d^k(x_l^i, x_{kNN}^j)$=is Euclidean distance from $x_l^i$ to its kNN point in class j
It is ranked in Module Feature Ranking 675, i.e., select the highest ranked feature subsets according to score $S_{Training}(k)$ where k is the feature determination. $S_{Training}(k)$ is determined offline from training data. Mathematically $S_{Final}(k)$ is represented as:

$$S_{Final}(k) = S_{Training}(k) \times \log(f(k))$$

$S_{Final}(k)$=final score
$S_{Training}(k)$=score from training data
f(k)=frequency of count of feature
In Module Feature Generation & Evaluation 680 the extracted features in 660 and 665 are evaluated for consistency and verified for accuracy to the subset of extracted features. The features are also verified for correct linkage with the target software/firmware referenced in 605. The features are then generated in XML format for future use in operations when data is in motion and stored in Module 155. In 680 processing consists of the use of forward, backward, compound, and random algorithmic functions. This processing also consists of evaluation measures such as divergence, consistency, irrelevant information, dependency, and distance (i.e., how far the data are separated) that provide the acceptable features (parameters, attributes, signatures, etc.)

In the aircraft operational mode, i.e., data in motion, the Target HW/SW 605 instantiated in volatile & nonvolatile memory passes to the Features Detection & Processing/Reduction in Dimensionality Module 610, which performs dimensionality reduction (for large numbers of observations and/or large numbers of variables) as a preprocessing step. Preferably, a machine learning algorithm is then used to remove irrelevant and redundant data, with the benefits of increasing offline training/learning accuracy, and providing more focused and repeatable results. This assists in achieving better performance of learning algorithms that ultimately improves predictive accuracy of classifiers (neural nets, K-nearest neighbor, decision tree, bayes, support vector machine, and other such algorithms) for feature extraction and refinement of the CCMBR models. In Module 610 data is transformed from a high-dimensional space (caused by large separation of data in Euclidian space) to a space of fewer dimensions, i.e., the low-dimensional data projection (feature extraction) retains its meaningful/essential properties of the original data, while eliminating non-relevant data. This data transformation may be linear, as in principal component analysis (PCA), but may also be nonlinear as in the Kernel PCA (kPCA). Independent Component Analysis (ICA) can have linear and nonlinear variants of feature selection techniques. The Feature Selection Module 620 (aka variable selection, attribute selection or variable subset selection), selects a subset of relevant features (variables, predictors) for use in CCMBR model validation. Feature selection techniques provide a mechanism for simplification of features interpretation, shorter training time for algorithms and models, and reduction in overfitting. In the Feature Selection existing features and evaluations are obtained from Module 155 relating to target hardware/software and compared with the current data from which features are to be extracted. This provides relevant information on changes in features & feature subsets occurring dynamically, and reduced computation. The Feature Extraction Module 630 creates new optimized features from feature subsets selection provided by Module 620. Module 630 reduces & optimizes the number of features in a dataset by creating new features from the existing ones and discarding the original features where the new features contain the information from the original set of features. Note that feature selection returns a subset of the features, whereas feature extraction creates new features from functions of the original features. In Feature Performance Measure Module 640 newly created features are tested for representation accuracy with original dataset features via abductive reasoning (a logical reasoning which constructs and tests a hypothesis based on observations). In New Features Module 650 the new features are transmitted back to Module 610 as representative features for comparison against dynamic changes, and formatted in XML format to be stored in Module 155.

Figure 8:
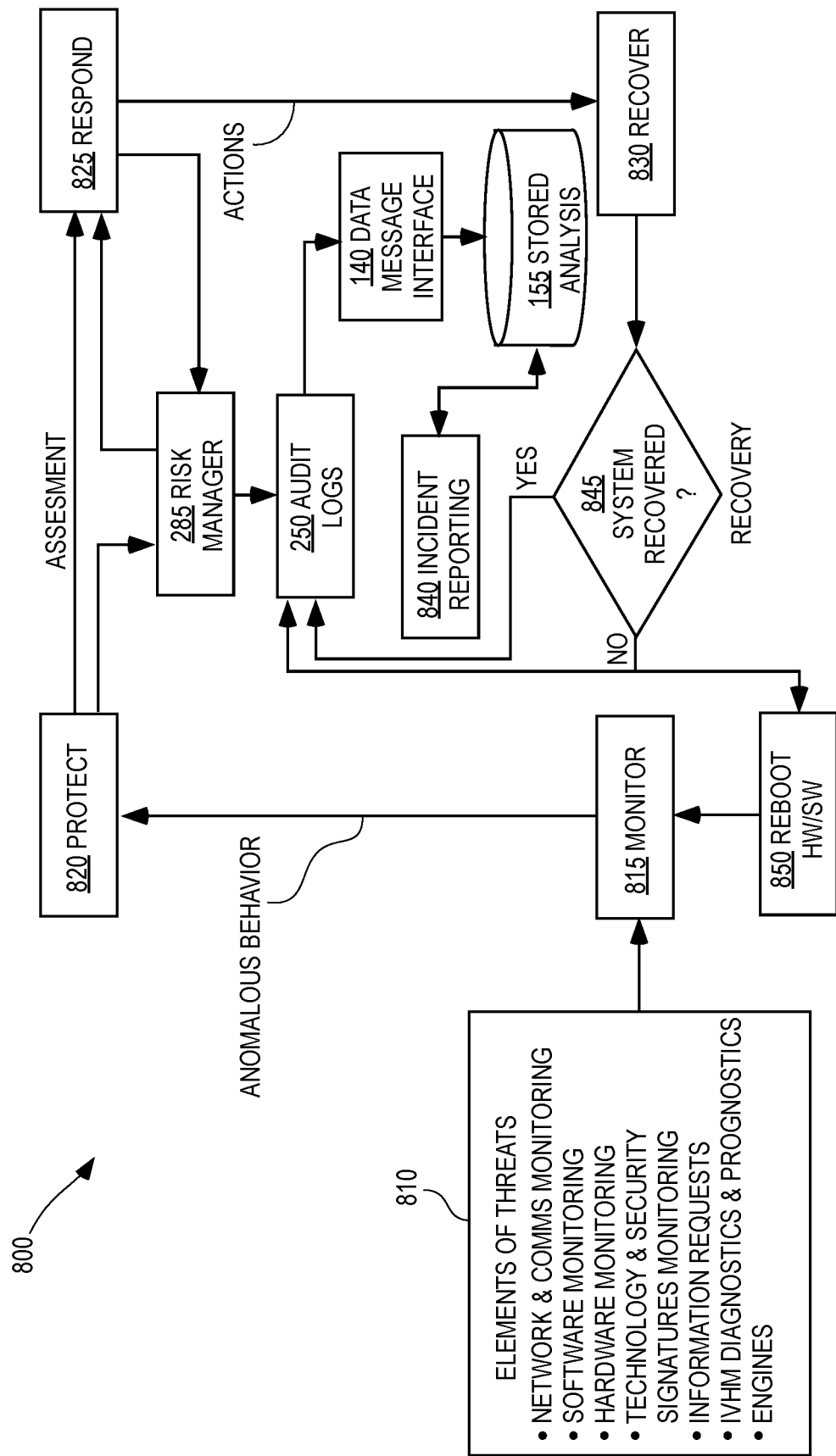
FIG. 8 is an exemplary method of a cybersecurity posture that includes protect, monitor, respond, and recover.

FIG. 8 is a method showing a cybersecurity posture, i.e., protect, monitor, respond, and recover (PMRR). Any violations of PMMR posture policies are registered in Audit Logs 250. Elements Of Threats 810 lists common elements where threats could be encountered, i.e., network & COMMS, HW/SW, technology & security signatures, information request, and alarms from the IVHM diagnostics and prognostics engines. Dynamically monitoring of changes has important implications to both cybersecurity and IVHM related issues when a change is found that is different from a corresponding stored specification. Similarly command & control messages and mission operator requests are monitored for changes from designed specifications. The Monitor Module/Step 815 monitors all incoming and outgoing messages and data from aircraft assets for anomalous behaviors (including Network & COMMS Monitoring, Software Monitoring, Hardware Monitoring, Technology & Security Signatures Monitoring, Information Requests, and IVHM Diagnostics & Prognostics Engines). Module 815, as implemented by hardware CCMMR 115, performs detection of anomalous cybersecurity behavior, their identification, and discrimination between IVHM related faults and failures versus cybersecurity threats, attacks, possible infections & breaches caused by VWTs, and root cause analysis. The IVHM faults and failures from component & sensor data are also checked for possible root cause due to existing VWTs and possibly new VWT signatures. In ambiguous determinations, a top-down and bottoms-up graphical node analysis is used (as shown in FIG. 4). In Protect Module 820, a protection posture is defined at various levels of VWT attack, thrust, threat, and breach (ATTB) analysis. This includes data at rest and aircraft in operation. Policies and protection methods are defined and developed for instance in 1) access control to data & information, 2) operating system patch implementations, 3) physical installation of electrical system protection devices, 4) physical installation of encryption/decryption devices, 5) software encryption/decryption applications, 6) off-board intranet and extranet firewalls securing access points and networks, 7) off-board access to web servers & email servers & filters, 8) technology refresh, 9) off-board training and learning systems, and others. These methods and polices are developed for utilization in the CCMBR Model by a Modeling Engineer and generated into XML Model File(s), as an example into Cybersecurity Specification 1001 & 1002. Any violation of these policies is the subject of Audit Logs 250 for later analysis and remedies. In Respond Module 825 strategies are developed by the modeling engineer for response against VWT ATTBs and deployed in the CCMBR models. As discussed earlier in Module 240 some of these responses are, delete memory contents from volatile memory in a specific address range(s) and continue with target HW/SW operations, delete infected relevant files from non-volatile memory, disinfect non-volatile and volatile memories, delete verified Trojans from non-volatile and volatile memory, limit I/O to specified design parameters (i.e., allocated design variables) at function and class level, restricted channel bandwidth communication, restricted API usage, inform and record/store all actions to mission operators and maintainers, and others. In Recover Module 830 recovery of the system back to its original (no cybersecurity threats) state may involve incremental updating using backup images of the system. When VWT infection occurs the state of the system can be recovered to the last good state of the system from this backup image after application of actions in Module 825 where the HW/SW elements of the aircraft are processed. Other methods of recovery may involve particular non-flight & safety critical Reboot HW/SW 850 and offline improvements to processes, procedures, technologies, and transition to new technologies. In Audit Logs Module 250 audit logs are searched for violation of policies and procedures. Aircraft systems are analyzed and those in violation are treated to remedy the violation. Management may choose to act on breaches of classified information. The Incident Reporting Module 840 creates and stores incident records in Module 155. These reports are later printed offline and distributed to pertinent organizations for further analysis and treatment. In System Recovered? Module 845 processing determines if the system has recovered to its original state. If NO, then the HW/SW elements are rebooted in Reboot HW/SW Module 850 back to their original state with the last good incremental backup image and data transmitted to 250 for further treatment and storage in 155.

FIG. 9 shows exemplary CCMBR model specifications for the hardware elements 901, software 902 and 903, and operating system 904. The CCMBR model is developed during design and stored in model library 220 as XML, files as shown in FIG. 9. Information received and/or derived from the actual hardware elements, software, and operating system are compared with the corresponding design specifications in the CCMBR model XML files for anomalous behavior against inputs 130. Any differences, results in anomalous behavior that triggers root cause analyses for IVHM fault/failure/degradation, hardware/software configuration changes, and cybersecurity threat processing.

Line 911 represents an XML declaration describing general properties of the document that indicates to an XML processor that an XML parser is needed to interpret the document. The character encoding, e.g. basic tags, in this example are in UTF-8 format. This information allows the XML parser to correctly interpret the specification information. Line 912 is an upper level XML tag that separates other upper level tags within the file. In the illustrated example, all information shown in specification 900 is part of the same level tag. Other levels of tags could, for example, describe an operating system, and software/firmware utilized. In line 913 a first hardware element is identified with its corresponding description (which includes configuration), attributes, behaviors, and actions. Examples of information contained could include: id_LCN would contain data that represents a logistics control number (LCN) given to the hardware element by the logistics group. serial_number would contain data that represents a manufacturer's serial number, name would contain data that represents a product name, description would contain data that represents a product description, version would contain data that represents the version number, firmware_version would contain data that represents the firmware driver version number, date_first_installed would contain data that represents the date the hardware element was installed on the aircraft, date_reinstalled would contain data that represents the date it was reinstalled post repair, date_updated would contain data that represents the date the hardware element was replaced by another equivalent unit, spec_version would contain data that represents a configuration item that provides the version on the specification document associated with the hardware element, and spec_last_update would contain data that represents the date when the specification was 1st updated. Line 914 for "dimension" represents the length, width and height of the hardware element given as respective floating-point numbers. Line 914A "IC list" contains information about the corresponding IC as a whole, and includes internal data bus widths, specification file name, and a list of the memory and register blocks in the IC. Line 915 "block_list" is a memory block list containing the registers and memory blocks in the IC with information specific to that block. Information may include the block size, i.e. address space, the type of memory, bit width of access to the block, and a list of registers in the block.

"Register" is a list of all the registers in the IC. The entries contain information specific to each register, such as, parent register block, reset value, and a text description of the register. It may also contain a list of the bit fields in the register as "bit_field_list". Included information is bit field name, size, position, and access type (read-only, write, etc.). Additional functional information may include functionality of bit fields. For example, a certain bit field may act as a write enable bit for a register or for a different bit field. Line 916 "calibration" represents floating-point values determined to properly calibrate parameters of the hardware element for appropriate operation in the particular aircraft system. Line 917 "target_config" represents all the attributes pertinent to the specific aircraft environment required to house/contain the hardware element. This may include electrical pin connections with various avionics buses, interconnections with other hardware elements, mechanical and/or chemical interfaces, place and position in the avionics bay, etc. Line 918 "input_interface" represents the various input data interfaces of the hardware element. Line 919 "output_interface" represents output data interfaces of the hardware element. As will be seen by "hardware_element_#", similar information, as indicated for hardware_element_1, is provided for each of the respective hardware elements. Line 920 "/hardware spec" is the XML ending block of the hardware element specifications on the aircraft. This denotes an end of the specification for all of the hardware elements.

The specifications 902 and 903 may reside as XML files which identify aircraft software elements, which can range from several hundred to several thousand on the aircrafts. This software information is parsed by an XML parser contained in the software CCMBR 110 to extract the necessary software security and configuration information. Similarly, the hardware information is parsed by an XML parser contained in the hardware CCMBR 115 to extract the necessary hardware security and configuration information. These XML files are generated by a modeling process by a modeling engineer based on information available from the manufacturer and data obtained by testing in various environments.

Line 921 defines the start of the <Target Software System Module> XML tag & block which is also the start of the software installed in various avionics computers in the aircraft. There is expected to be hundreds to thousands of these software systems. Line 922 shows the start of the first software system <SW_1> installed on an avionics computer in which: id=" ", name=" ", description=" ", version=" ", date_first_installed=" ", date_reinstalled=" ", date_updated=" ", spec_version=" ", spec_last_update=" ", language=" ", configuration_info=" ", SLOC=" ", in which corresponding data associated with SW_1 is stored. The description contains info on the avionics computers or other controllers on which SW_1 is installed. SLOC is the source lines of code in SW_1. Line 923 represents the <class> (object) definition of SW_1. The implementation of <class> is represented by its object. It has id=" " and name=" " information. Line 924 contains data for the <method> for the class and includes model=" ", id=" ", name=" ", and function=" " information. Line 925 contains data for each <class><method> such as the <input_interface> with <address> . . . </address> in memory and associated <data> . . . </data> in I/O interfaces. Line 926 contains data for each <class><method> such as the <output_interface> with <address> . . . </address> in memory and associated <data> . . . </data> in I/O interfaces. Line 927, for each <class><method>, defines <states> . . . </states> that represent the APIs, object methods, and object functions all called I/O interfaces states (i.e., invariant, modified, static, dynamic). The states of I/O interfaces must always be invariant whether reflecting static or dynamic class object behaviors. If the interfaces have modified inputs and outputs, i.e., the I/O interfaces are non-invariant (function as were designed), this is a cause for alarm. Modified I/O interfaces inputs and outputs may occur due to viruses acting upon these changing their behavior and data from that originally designed and implemented. Line 928, for each <class><method>, has <modes> . . . </modes> that refer to the visibility of the class object (an object is an implementation of the class in memory). These are private (methods within the class only), protected (classes & methods within a package/directory), and public (by all classes & methods within the program no matter which package/directory they reside). Line 929, for each <class>, contains <constraint> . . . </constraint> that are various types of constraints, i.e., actor-based, class-based, concurrent, prototype-based; by separation of concerns: aspect-based, subject-oriented, recursive, symbolic, value-level, function-level; as well as constraint logic programming. Line 930, for each <class>, contains <rules> . . . </rules> which are correctness of language syntax, safety, security, correctness of common conventions, object-oriented, extensibility, and portability.

Line 931 labeled <runtime> specifies the runtime behavior of SW_1 in an operating system (OS) and is at the level of <class> in the XML file. It has an attribute id=" ". Line 932, <runtime><requires>, are an input list (i.e., atomized table, runtime variables, multicore processing, distributed computing) for an OS. Any dynamic changes in the input runtime variable is a cause for alarm unless required by designed for dynamic data bindings. Outputs are monitored for any design specification changes observed during operations (i.e., interconnections with other systems on the aircraft, OS services such as volatile & nonvolatile memory reading & writing, multicore processing, and distributed computing needs). Line 933, <runtime><properties>, are runtime requested properties that may include verification, time, scheduling, and contexts. Verification includes techniques as runtime monitoring, variable & model checking, reflection, runtime analysis (dynamic, symbolic, trace, log file, audit file). Line 934, <runtime><dependencies>, are runtime dependencies that may include methods of compiling, linking, building, shared/dynamic library, native libraries, plugins, and linkages with other software objects. Line 935, <runtime><behaviors>, refers to data for methods devised for optimization including computation performance, volatile & nonvolatile memory utilization, and communication (internal & external). Line 936, <runtime><deterministic>, refers to data for runtime sequential processing of scheduled tasks in a deterministic way; meaning that each task must complete in a preset scheduled time. Otherwise, not meeting the time schedules may lead to catastrophic failure of the aircraft (especially for flight control systems). Real-time OS such as VxWorks and Integrity (as may be used for avionics computers), are able to meet time scheduled deterministic program tasks. Line 937, <runtime><eventdriven>, refer to operating systems (such as Windows, Linux, Mac OS) that perform tasks based on program triggers or events. An event driven OS does not have to meet time schedules unless scheduled by timers and concurrent processes. GUI applications are specific to event driven OS. Line 938, </runtime>, is an XML end block of the runtime specification of SW_1. As indicated, there will be hundreds if not thousands of software specifications associated with different elements in an aircraft.

Line 939, <OS_spec>, is the beginning XML tag/block for the operating system specification. An OS is a software specification that has hardware and software component definitions. It is the core program that provides communication between system hardware (computation elements on the motherboard), motherboard support packages, firmware, and other software components running on it. It allows access to hardware, applications, and users. Line 940, <OS_spec><definitions>, contains the name of OS and refers to all the hardware and software component services available for the OS, i.e., board chip level services, multi-core access, access to peripherals, access to reduced instruction set (RISC), firmware, and other software program services. Line 941, <OS_spec><definitions><types>, refers to details of OS, e.g., whether it embedded real-time, event driven, its bit structure (8, 16, 32, 64-bits), the target hardware on which it can operate, graphical or command based, and its hardware and software architecture. Line 942, <OS_spec><definitions><interfaces>, defines the interfaces for board support packages, APIs for chip level I/O programming, general processor chip level APIs for application programming, APIs for graphical processor programming. Line 943, <OS_spec><definitions><bindings>, defines data bindings that are either statically compiled or available dynamically at runtime for the OS. Line 944, <OS_spec><definitions><services>, lists all hardware and software services available on the OS. For instance, software services may include batch processing, multi-tasking, time-shared processing, distributed processing, algorithms (neural-nets) for better CPU performance, etc. Hardware services may include plug-and-play services, etc. Line 945, <OS-spec><properties>, identifies various elements required to run applications on the OS, such as little-endian or big-endian, spooling (I/O processes), etc. Line 946, </OS_spec>, is the XML end block of the SW_1 OS specification. Line 947, <SW_2> . . . </SW_2>, is the next XML block for the next software element containing all the XML elements given for SW_1, i.e. Lines 922-947. Line 948, <SW N> . . . </SW N>, is the last software element "N" XML block. Line 949, </Target Software System Module>, is the XML end block for all software elements/specification for the aircraft.

FIG. 10 is an exemplary cybersecurity specification 1001 and 1002 which provides cybersecurity information for the hardware elements including associated software. Modules 1001 and 1001 are an exemplary XML format that can be used to contain an aircraft cybersecurity specification. It provides information on existing virus, worms, and Trojans (VWT) that can affect the security and safety of the aircraft. Existing signatures are known for many of these VWT. VWT can range from several hundred to several thousand different types on the aircrafts. The cybersecurity specification also includes information for its own self-health that is continuously monitored. These XML files are parsed by an XML parser contained in the software and hardware CCM-BRs 110 and 115 to extract the necessary hardware & software security and configuration information. These XML files may be generated during a modeling process by a modeling engineer, followed by testing, updating, and validation.

Line 1011 is the start of the <cybersecurity_spec> XML tag & block which is also the start of the software/hardware related cybersecurity domain knowledge of the aircraft when in operation and when at rest (data at rest). The specification can be installed in multiple avionics computers in the aircraft or on a few avionics computers and controllers in a centralized computation architecture. The computers that implement the cybersecurity specification may be dedicated to only that task or may support multiple timeshared additional functions. Line 1012, <cybersecurity_spec><signatures>, is the start of a list of known VWTs that will have signatures that define their properties and their destructive effect on the system, as well as their methods for infecting the system. Line 1013, <cybersecurity_spec><signatures><virus 1>, is the first virus registered in a signature table in CM & Security Postures & Signatures Library database 230. Note that "virus" is general term used for VWT. These signatures are continually updated in the database for their effect on the system. Note that in Line 1014<properties> the name of this first virus is "flame". It was designed for system attack functions and is being used for cyber espionage by certain countries. There are other viruses, to name a few: "boost" is a virus that functions for information gathering, "munch" is a virus that installs and propagates throughout the system affecting all software systems, etc. Line 1014, <cybersecurity_spec><signatures><properties>, has data corresponding to configuration attributes: name="flame", id_config_key=" ", time_config_key=" ", log_percentage=" ", version_key_config=" ", IP_time_config=" ", P_check_key=" ", BPS_config=" ", BPS_key=" ", proxy_server_key=" ", getVirusId=function( ). These parameters define characteristics of the VWTs that could infect the system. The actual parameters utilized in the system are compared in real time by hardware/software CCMBR with the corresponding signature parameters to determine if a particular VWT is present, followed by actions leading to disinfection the VWTs from the system. Line 1015, <cybersecurity_spec><signatures></properties>, is the XML end-of-block for <properties>. Line 1016, <cybersecurity_spec><signatures><behaviors>, identifies various possible modes of malware infections, some of which are: espionage, internet bandwidth consumption, computational consumption, hardware/software destruction, fast propagation infecting other software, and so on. <actions> . . . </actions> are the corresponding methods & algorithms necessary to disinfect the VWTs, once found, and bring the system back to its original uninfected functionality. Line 1017, <cybersecurity_spec><signatures><virus_N> . . . <virus_N>, is the last virus in the signature table in CM & Security Postures & Signatures Library database 230. Line 1018, <cybersecurity_spec></signatures>, is the XML end-of-block for <signatures>.

Line 1019, <cybersecurity_spec><postures>, begins parameters that are defined to protect, monitor, respond, and recover from a detected cybersecurity threat. These parameters are determined by a cybersecurity team. Line 1020, <protect>, contains rules/instructions for the protection of system assets, especially hardware elements, and artifacts. These rules are for safeguarding confidentiality, integrity, availability, authenticity, and non-repudiation. Line 1021, <monitor>, contains rules for monitoring system assets and artifacts in operation, e.g. aircraft systems in operation, and at rest. Line 1022, <respond>, contains rules for a time-critical response against a detected VWT attack. Line 1023, <recover>, contains rules for a time-critical recovery of the system assets and artifacts to their original state or at least to a stable state not subject to the detected VWT attack. Line 1024, <CCExec_self_health>, is a self-health diagnostics capability of the software and hardware CCMBRs 110, 115 and provides for the generation of an alarm conveyed to the Pilot Display 190 where a self-health anomaly decision is made by the pilot. Line 1025, <CCExec_self-health><properties>, includes algorithms for detection, identification, isolation, false alarms detection and root cause analysis associated with a self-health anomaly. Line 1026, <CCExec_self_health><behaviors>, includes algorithms and rules for monitoring for anomalous behaviors and corresponding countermeasure actions where an interface with the CCMBRs exhibit anomalous behavior. Line 1027, <CCExec_self_health><operations>, include algorithms and rules for corrective actions upon identification of faults in the CCMBRs. Line 1028, <CCExec_self_health><health>, defines the start for the monitoring of the CCMBRs for continuous operation. Line 1029, </heartbeat>, monitors the CCMBRs functionality every 1 second (variable) and sends the output to the Pilot Display 190. An alarm is generated when CCMBRs fails to generate 5 consecutive heartbeats. Line 1030, <CCExec_self_health></health>, is the XML end-of-block indicia for the <health> section starting at line 768. Line 1031, </CCExec_self_health>, is the XML end-of-block indicia for <CCExec_self_health> starting at line 1024. Line 1032, </cybersecurity_spec>, is the XML end-of-block indicia for the <cybersecurity_spec> starting at line 1011.

Figure 11:
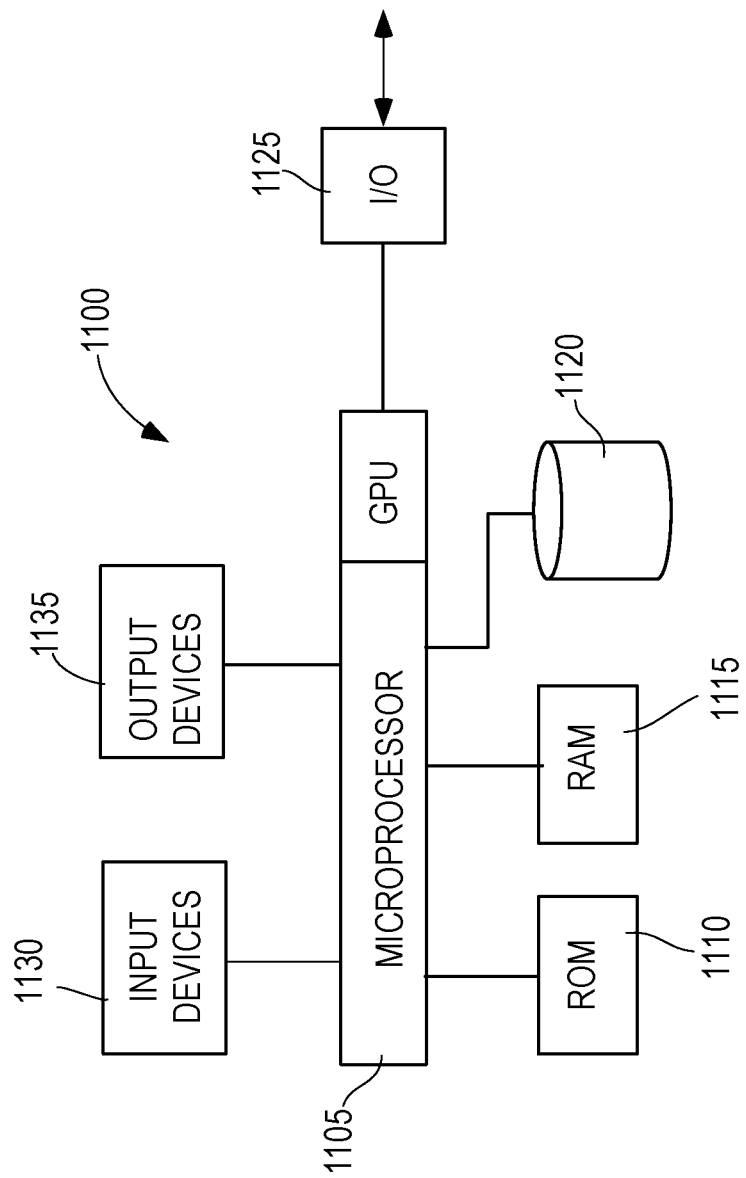
FIG. 11 shows a block diagram of an exemplary computing system 1100 for implementing the processing of information as represented by digital data for the cybersecurity and configuration specification information of the system.

FIG. 11 is a block diagram of an exemplary computing system 1100 for implementing the processing of information as represented by digital data for the cybersecurity system as shown in FIG. 2. A microprocessor 1105 is central to the processing of data and may include an arithmetic processing unit and/or a graphical processing unit (GPU). Alternatively, a GPU may be used by itself to process some of the computations/decisions, i.e. process other than "graphical" information. A read-only memory (ROM) 1110 contains stored program instructions and data for use by the microprocessor 1105. A random-access memory (RAM) 1115 is also used by the microprocessor 1105 as a location where data may be stored and later read (the graphical processing unit (GPU) also has its own RAM). A nonvolatile memory device 1120 is utilized to store instructions and/or data that will not be lost upon a loss of power to the computing system. An input/output (I/O) buffer 1125 is coupled to the microprocessor 1105 and facilitates the receipt of external data and the transmission of data from the microprocessor to external devices. Input devices 1130 represent conventional ways for a user to input information to the computing system, e.g. keyboard, mouse, etc. Output devices 1135 are conventional ways for information to be conveyed from the computer system to a user, e.g. video monitor, printer, etc. Depending on the number of parallel cores of the microprocessor 1105 (or the GPU), all cores provide sufficient computational power needed to process the data from all sensors and sources in accordance with the processing explained above. For example, one core may be used to process all the data and decisions for the FWD Engine of FIG. 4 since all output data in that group will need to be stored and compared against the outputs of the other nodes in that group. Also, the same microprocessor or a different core of the microprocessor may be utilized to implement the MBR analysis system 202 which monitors for cybersecurity threats to the FWD Engine.

As will be understood by those skilled in the art, the ROM 1110 and/or nonvolatile storage device 1120 will store an operating system by which the microprocessor 1105 is enabled to communicate information to and from the peripherals as shown and with external devices via I/O 1125. More specifically, data is received through the I/O 1125, stored in memory, and then processed in accordance with stored program instructions to achieve the detection and comparison of anomalies and states/values of the devices represented as nodes in FIG. 4. Based on the analysis of the states of the nodes as illustrated in FIG. 4 in accordance with stored rules of logical relationships, the computer system determines the respective current states of the different related nodes and makes a logic comparison of the respective current states to each other. The respective states of the nodes are compared to a predetermined stored table of sets of state combinations where some sets define a cybersecurity causation and other sets define a degradation causation. Depending on which set is a match with the current states of respective nodes, this provides a logic determination of whether the associated anomaly is caused by a cybersecurity threat, a degradation of performance, or both. Other subsystems and LRUs of the vehicle/aircraft are similarly represented by corresponding logic tables in order to provide similar logic determinations of whether an associated anomaly is caused by a cybersecurity threat.

The invention claimed is:

1. A method, implemented by a computing system onboard a vehicle, identifies cybersecurity threats originating from hardware components of the vehicle, the method comprising the steps of:

representing at least some of the hardware components of the vehicle where each of the at least hardware components is represented as a group of related nodes, where each node in the group of nodes for each hardware component generates a state that represents a current condition of an attribute of the hardware component;

receiving an indication of a behavioral anomaly associated with a first hardware component;

determining the states originated by the first hardware component of the respective nodes in a first group of nodes;

comparing the states of the nodes in the first group of nodes with stored sets of states of nodes in the first group;

determining whether the anomaly associated with the first hardware component is caused by a cybersecurity threat or by health degradation of the first hardware component based on the comparison of the states of the nodes of the first group with the sets of possible states of the respective nodes, the stored first sets of combinations of states of the nodes of the first group that indicate cybersecurity threat causation of the anomaly and second sets of combinations of states of the nodes of the first group of nodes that indicate health degradation causation of the anomaly, a determination that the states of the nodes of the group of nodes matches node states in one of the first sets results in the determination that the anomaly associated with the first hardware component is caused by a cybersecurity threat, a determination that the states of the nodes of the first group of nodes matches node states in one of the second sets results in the determination that the anomaly associated with the first hardware component is caused by a health degradation.

2. The method of claim 1 wherein the determining step determines that the states of the nodes of the group of nodes matches node states in one of the first sets and also matches node states in one of the second sets with a resulting determination that anomalies in the first hardware component are caused by both a cybersecurity threat and a health degradation.

3. The method of claim 1 wherein the hardware component contains an integral microprocessor and corresponding stored instructions resident in the hardware component, the determining step determining that the states of the nodes of the group of nodes matches node states in one of the first sets and that the states in one of the first sets that is a match indicates that the anomaly associated with the first hardware component is caused by a cybersecurity threat resident in the stored instructions.

4. The method of claim 1 wherein the determining step determines that the states of the nodes of the group of nodes matches node states in one of the first sets and that the states in the one of the first sets that is a match indicates that the anomaly associated with the first hardware component is caused by a cybersecurity threat based on current parameters of a physical attribute of the hardware component that differs from corresponding parameters of the physical attribute in a stored authentic set of parameters.

5. The method of claim 1 wherein the determining step determines that the states of the nodes of a group of nodes matches node states in one of the first sets that the states in the one of the first sets that is a match indicates that the anomaly associated with the first hardware component is caused by a cybersecurity threat based on current configuration parameters that differs from the corresponding parameters of the configuration attributes in a stored authentic set of configuration attributes.

6. A computer program product, comprising a computer usable tangible non-transitory medium having a computer readable program code embodied therein, said computer readable program code adapted to be executed to implement a method for identifying cybersecurity threats originating from hardware components on-board a vehicle, said method comprising:
  representing at least some of the hardware components of the vehicle where each of the at least hardware components is represented as a group of related nodes, where each node in the group of nodes for each hardware component generates a state that represents a current condition of an attribute of the hardware component;
  determining the states originated by the first hardware component of the respective nodes in a first group of nodes upon receipt of an indication of a behavioral anomaly associated with a first hardware component;
  comparing the states of the nodes in the first group of nodes with stored sets of states of nodes in the first group;
  determining whether the anomaly associated with the first hardware component is caused by a cybersecurity threat or by health degradation of the first hardware component based on the comparison of the states of the nodes of the first group with the sets of possible states of the respective nodes, the stored first sets of combinations of states of the nodes of the first group that indicate cybersecurity threat causation of the anomaly and second sets of combinations of states of the nodes of the first group of nodes that indicate health degradation causation of the anomaly, a determination that the states of the nodes of the group of nodes matches node states in one of the first sets results in the determination that the anomaly associated with the first hardware component is caused by a cybersecurity threat, a determination that the states of the nodes of the first group of nodes matches node states in one of the second sets results in the determination that the anomaly associated with the first hardware component is caused by a health degradation.

7. The computer program product of claim 6 wherein the method of determining determines that the states of the nodes of the group of nodes matches node states in one of the first sets and also matches node states in one of the second sets with a resulting determination that anomalies in the first hardware component are caused by both a cybersecurity threat and a health degradation.

8. The computer program product of claim 6 wherein the hardware component contains an integral microprocessor and corresponding stored instructions resident in the hardware component, the method of determining determines that the states of the nodes of the group of nodes matches node states in one of the first sets and that the states in one of the first sets that is a match indicates that the anomaly associated with the first hardware component is caused by a cybersecurity threat resident in the stored instructions.

9. The computer program product of claim 6 wherein the method of determining determines that the states of the nodes of the group of nodes matches node states in one of the first sets and that the states in the one of the first sets that is a match indicates that the anomaly associated with the first hardware component is caused by a cybersecurity threat based on current parameters of a physical attribute of the hardware component that differs from corresponding parameters of the physical attribute in a stored authentic set of parameters.

10. The computer program product of claim 6 wherein the method of determining determines that the states of the nodes of a group of nodes matches node states in one of the first sets that the states in the one of the first sets that is a match indicates that the anomaly associated with the first hardware component is caused by a cybersecurity threat based on current configuration parameters that differs from the corresponding parameters of the configuration attributes in a stored authentic set of configuration attributes.

* * * * *